United States Patent
Aio

(10) Patent No.: US 12,302,186 B2
(45) Date of Patent: *May 13, 2025

(54) WIRELESS DEVICE, AND WIRELESS COMMUNICATION METHOD OF WIRELESS DEVICE, WIRELESS TERMINAL, AND WIRELESS COMMUNICATION METHOD OF WIRELESS TERMINAL, AND WIRELESS BASE STATION, AND WIRELESS COMMUNICATION METHOD OF WIRELESS BASE STATION

(71) Applicant: Sony Group Corporation, Tokyo (JP)

(72) Inventor: Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,811

(22) Filed: Apr. 8, 2024

(65) Prior Publication Data
US 2024/0251319 A1   Jul. 25, 2024

Related U.S. Application Data

(63) Continuation of application No. 17/419,293, filed as application No. PCT/JP2019/051423 on Dec. 27, 2019, now Pat. No. 12,082,066.

(30) Foreign Application Priority Data

Jan. 15, 2019   (JP) .................................. 2019-004039

(51) Int. Cl.
*H04W 36/30*   (2009.01)
*H04W 48/10*   (2009.01)
(Continued)

(52) U.S. Cl.
CPC ......... *H04W 36/30* (2013.01); *H04W 36/302* (2023.05); *H04W 48/10* (2013.01);
(Continued)

(58) Field of Classification Search
CPC ... H04W 36/30; H04W 36/302; H04W 48/10; H04W 48/20; H04W 76/10; H04W 88/12; H04W 84/12; H04W 48/12
See application file for complete search history.

(56) References Cited

U.S. PATENT DOCUMENTS

2006/0234756 A1   10/2006   Yamasaki et al.
2008/0062933 A1   3/2008   Liu et al.
(Continued)

FOREIGN PATENT DOCUMENTS

JP   2004-349971 A   12/2004
JP   2006-050366 A   2/2006
(Continued)

OTHER PUBLICATIONS

International Search Report and Written Opinion mailed on Mar. 10, 2020, received for PCT Application PCT/JP2019/051423, Filed on Dec. 27, 2019, 12 pages including English Translation.

*Primary Examiner* — Nizam U Ahmed
(74) *Attorney, Agent, or Firm* — XSENSUS LLP

(57) ABSTRACT

A communication device determines a communication quality with a base station, requests a neighboring base station for a transition judgment information to transmit information to become a judgment criterion of the communication quality to be included in a Beacon signal at a stage before the communication quality degrades to an extent that the base station is immediately switched, and selects a base station with which a communication connection should be established on the basis of the transition judgment information included in the Beacon signal transmitted in response to the
(Continued)

transition judgment request. The communication device is applicable to a communication system in the wireless LAN.

6 Claims, 26 Drawing Sheets

(51) Int. Cl.
*H04W 48/20* (2009.01)
*H04W 76/10* (2018.01)
*H04W 84/12* (2009.01)
*H04W 88/12* (2009.01)

(52) U.S. Cl.
CPC ........... *H04W 48/20* (2013.01); *H04W 76/10* (2018.02); *H04W 88/12* (2013.01); *H04W 84/12* (2013.01)

(56) References Cited

U.S. PATENT DOCUMENTS

| | | |
|---|---|---|
| 2011/0130149 A1 | 6/2011 | Yao et al. |
| 2011/0317669 A1 | 12/2011 | Inoue et al. |
| 2015/0098447 A1* | 4/2015 | Kim .................. H04L 27/2602 370/331 |
| 2016/0029356 A1 | 1/2016 | Bhanage et al. |
| 2016/0212674 A1 | 7/2016 | Nakamura et al. |
| 2018/0098378 A1 | 4/2018 | Patil et al. |
| 2018/0368049 A1 | 12/2018 | Patil et al. |
| 2019/0007969 A1 | 1/2019 | Shako |

FOREIGN PATENT DOCUMENTS

| | | |
|---|---|---|
| JP | 2007-158765 A | 6/2007 |
| JP | 2007-174495 A | 7/2007 |
| JP | 2009-049545 A | 3/2009 |
| JP | 2009-171445 A | 7/2009 |
| JP | 2010-219997 A | 9/2010 |
| JP | 2015-041811 A | 3/2015 |
| JP | 2017-041744 A | 2/2017 |

\* cited by examiner

FIG. 16

| ID | Criteria | Required Beacon Element ID |
|---|---|---|
| 1 | RSSI | — |
| 2 | BSS Load | 28 : BSS Load |
| 3 | Access Delay | 39 : BSS Average Access Delay |
| 4 | QoS | 35 : QoS Capability |
| ... | ... | |

*FIG. 20*

| Priority | Service | Criteria | Required Beacon Element ID |
|---|---|---|---|
| 0 | File Download | RSSI | – |
| 1 | Video Call | RSSI, BSS Load | 28 : BSS Load |
| 2 | Real-Time Gaming | Accesses Delay, RSSI, BSS Load | 39 : BSS Average Access Delay<br>28 : BSS Load |
| ... | ... | ... | ... |

FIG. 25

| Element ID | Length | Element ID Extension | Required Beacon Element ID |
|---|---|---|---|
| 1 | 1 | 1 | N |

Octet:

WIRELESS DEVICE, AND WIRELESS COMMUNICATION METHOD OF WIRELESS DEVICE, WIRELESS TERMINAL, AND WIRELESS COMMUNICATION METHOD OF WIRELESS TERMINAL, AND WIRELESS BASE STATION, AND WIRELESS COMMUNICATION METHOD OF WIRELESS BASE STATION

CROSS-REFERENCE TO RELATED APPLICATION

The present application is a continuation of U.S. application Ser. No. 17/419,293, filed Jun. 29, 2021, which is based on PCT filing PCT/JP2019/051423, filed Dec. 27, 2019, which claims priority to JP 2019-004039, filed Jan. 15, 2019, the entire contents of each are incorporated herein by reference.

TECHNICAL FIELD

The present disclosure relates to a wireless device, and a wireless communication method of the wireless device, a wireless terminal, and a wireless communication method of the wireless terminal, and a wireless base station, and a wireless communication method of the wireless base station, and, in particular, relates to a wireless device, and a wireless communication method of the wireless device, a wireless terminal, and a wireless communication method of the wireless terminal, and a wireless base station, and a wireless communication method of the wireless base station, which are capable of achieving stable communication in response to a change in a communication environment of a wireless local area network (LAN).

BACKGROUND ART

These years, in order to expand wireless local area network (LAN) services, use cases of installing a plurality of wireless base stations in buildings such as offices and homes are increasing.

Therefore, a wireless terminal that starts a wireless LAN service has to select an optimum wireless base station from a plurality of existing wireless base stations.

Furthermore, in a similar manner for wireless terminals such as laptop computers and smartphones that are considered to use wireless LAN services while moving, it is desirable to switch the connection to the optimum wireless base station in every situation so as not to disconnect the communication, and to make a transition to another basic service set (BSS).

For this purpose, a technique for the BSS transition while maintaining a stable communication state has been proposed (see Patent Document 1).

CITATION LIST

Patent Document

Patent Document 1: Japanese Patent Application Laid-Open No. 2007-158765

SUMMARY OF THE INVENTION

Problems to be Solved by the Invention

Generally, it is not until the communication quality (signal to interference plus noise ratio (SINR), a packet success rate, a delay, or the like) of a wireless terminal itself degrades that the wireless terminal starts a process of deciding whether or not to make the BSS transition.

However, in an environment in which a plurality of wireless base stations is installed close to each other, it is desirable to actively perform a transition process in a case where another base station is capable of ensuring a better communication quality.

However, in the current situation, what the wireless terminal is capable of directly acquiring from a neighboring wireless base station is only information included in a Beacon signal that has been transmitted by such a wireless base station, and what type of information is to be placed in the Beacon signal depends on the wireless base station.

For this reason, in a case where the wireless terminal judges the BSS transition using information other than a received electric power (RSSI), unless the Beacon signal that has been transmitted from the wireless base station includes the necessary information, the wireless terminal is not capable of judging the BSS transition.

For example, Patent Document 1 introduces an example of comparing the number of connected terminals placed in the Beacon signal of a neighboring access point (AP) to judge whether or not to make the BSS transition. However, in a case where the neighboring wireless base station does not place the information regarding the number of connected terminals in the Beacon signal, the BSS transition cannot be judged.

As an example of making the BSS transition using a judgment criterion other than the received electric power, conceivable is an active scan method in which a wireless terminal issues a Probe Request or a method of entrusting the judgment to a centralized control station capable of collecting information regarding all wireless base stations and controlling them.

However, in these processes, it takes time to exchange information and the like on the wireless communication, and therefore takes time for the BSS transition.

For such a reason, the wireless terminal is not capable of judging which wireless base station is desirable to be connected with, by acquiring only the Beacon signal that has been transmitted from the neighboring wireless base station.

The present disclosure has been made in view of the above circumstances, and in particular, selects an optimum wireless base station with which a communication connection should be established on the basis of information included in a Beacon signal that has been transmitted from a neighboring wireless base station, and achieves stable communication in response to a change in a communication environment.

Solutions to Problems

A wireless device in a first aspect of the present disclosure is a wireless device including a control unit configured to control inclusion information included in a Beacon signal in a wireless base station that is to establish a communication connection for communication with a wireless terminal.

A wireless communication method in the first aspect of the present disclosure corresponds to a first wireless device.

In the first aspect of the present disclosure, the inclusion information included in the Beacon signal in the wireless base station that is to establish the communication connection for communication with the wireless terminal is controlled.

A wireless terminal in a second aspect of the present disclosure is a wireless terminal including a control unit configured to select a new wireless base station with which the wireless terminal is to establish a communication connection on the basis of inclusion information included in a Beacon signal transmitted from a neighboring wireless base station.

A wireless communication method in the second aspect of the present disclosure corresponds to a second receiving device.

In the second aspect of the present disclosure, the new wireless base station that is to establish the communication connection is selected on the basis of the inclusion information included in the Beacon signal transmitted from the neighboring wireless base station.

A wireless base station in a third aspect of the present disclosure is a wireless base station including a control unit configured to receive a control notification for providing notification of inclusion information to be included in a Beacon signal, and configured to transmit the Beacon signal including the inclusion information on the basis of the control notification.

A wireless communication method in the third aspect of the present disclosure corresponds to a third wireless base station.

In the third aspect of the present disclosure, the control notification for providing notification of the inclusion information to be included in the Beacon signal is received, and the Beacon signal including the inclusion information is transmitted on the basis of the control notification.

BRIEF DESCRIPTION OF DRAWINGS

FIG. 16 is a diagram illustrating a configuration of a Beacon Element decision table.

FIG. 20 is a diagram illustrating an example in which a Mandatory Element ID in the Required Beacon Element ID included in a Beacon Element control notification is set beforehand according to a service in the communication device.

FIG. 25 is a diagram illustrating a configuration of a Beacon Element control notification frame in the communication system of FIG. 23.

MODE FOR CARRYING OUT THE INVENTION

Figure 1:
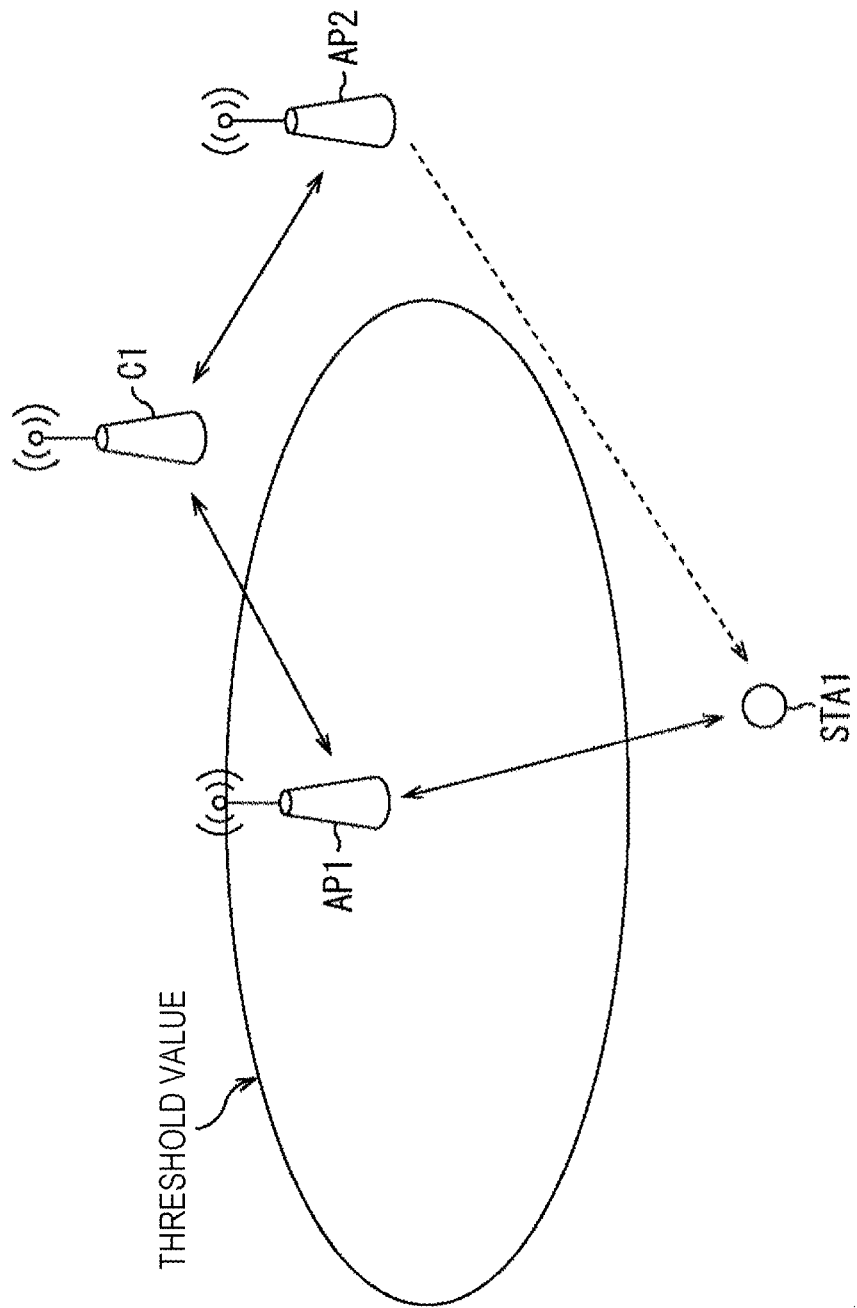
FIG. 1 is a diagram illustrating a general communication system.

Preferred embodiments of the present disclosure will be described in detail below with reference to the accompanying drawings. It is to be noted that in the present specification and the drawings, components having substantially the same functional configuration are designated by the same reference numerals, so that duplicate description will be omitted.

Hereinafter, modes for carrying out the present technology will be described. The description will be given in the following order.

1. Outline of the present disclosure
2. First Embodiment
3. First application example of first embodiment
4. Second application example of first embodiment
5. Third application example of first embodiment
6. Second Embodiment
7. Example performed by software 1. Outline of the Present Disclosure The present disclosure is a communication system for achieving stable communication in response to a change in a signal reception environment in a wireless local area network (LAN) or a wave local area network standardized by IEEE 802.11.

The outline of the present disclosure will be described.

A communication system standardized by IEEE 802.11 generally includes a controller C1, base stations (access points) AP1 and AP2, and a communication device STA1. It is to be noted that FIG. 1 shows an example of two base stations AP1 and AP2. However, the number of the base stations may be larger than that.

The communication device STA1 is, for example, a smartphone, a personal computer (PC), or the like used by a user, establishes a communication connection with the base station AP1 or AP2, and is connected in communication with a basic service set (BSS) managed by the base station AP1 or AP2, and transmits and receives data and programs.

In addition, the communication device STA1 monitors RSSI (the received electric power) indicating a communication state related to the communication with the base station AP1 or AP2, with which a communication connection is currently established. In a case where the RSSI is lower than a predetermined threshold value, the communication device STA1 transmits a BSS transition query to the controller C1 via the base station AP1 or AP2 with which the communication connection is established.

The controller C1 selects a base station with which the communication device STA1 should be connected on the basis of the BSS query from the communication device STA1, and supplies the information regarding the communication device STA with the information regarding the base station that has been selected, as a BSS transition request.

Upon reception of the BSS transition request, the communication device STA1 transmits a BSS transition response to the controller C1, also makes a connection application to the base station that has been designated by the BSS transition request, and establishes a communication connection.

More specifically, for example, as shown in FIG. 1, it is assumed that the connection between the communication device STA1 and the base station AP1 is established. That is, in FIG. 1, as indicated by a solid arrow, the communication connection between the communication device STA1 and the base station AP1 is established. It is assumed that the communication device STA1 is in a state of being capable of transmitting and receiving various data and programs via the base station AP1.

In this situation, the communication device STA1 measures the RSSI (the received signal strength), which is a signal quality of a download signal (hereinafter, also referred to as a DL signal), while transmitting and receiving data via the base station AP1, and monitors whether or not the RSSI becomes lower than a predetermined threshold value.

As shown in FIG. 1, for example, the communication device STA1 is apart from the base station AP1 by a predetermined distance, and therefore when the RSSI becomes lower than a predetermined threshold value th, the communication device STA1 transmits a BSS transition query to the controller C1 via the base station AP1 with which the connection is established, so as to inquire about a base station AP that manages a BSS with a better communication environment.

It is to be noted that the solid line of the threshold value th in FIG. 1 indicates a distance between the communication device STA1 and the base station AP1, when the degradation in the signal quality that occurs as the communication device STA1 moves away from the base station AP1 becomes the threshold value th that necessitates the BSS transition.

In response to the BSS transition query, it is assumed that the controller C1 selects the base station AP2 in FIG. 1, as the base station that manages the BSS with a better communication environment. In this situation, the controller C1 transmits a BSS transition request for requesting the communication device STA to make a transition of the communication connection to the base station AP2 via the base station AP1 with which the connection is currently being established.

Upon reception of the BSS transition request, the communication device STA1 transmits a BSS transition response to the base station AP1 with which the connection is being established, and also applies a communication connection to the base station AP2 on the basis of the BSS transition request, so that since then, the communication continues in the BSS managed by the base station AP2.

By repeating the above process, the communication device STA1 switches the base station according to the RSSI state, and makes a BSS transition, so as to maintain the communication state and continue the communication via the base station with which the communication connection has been established.

However, in the case of FIG. 1, when the RSSI becomes lower than the predetermined threshold value th, even though the communication state has degraded, the communication device STA1 cannot make a BSS transition, unless the communication device STA1 once makes a BSS transition query to the controller C1 via the base station AP1, a BSS transition destination is decided by the controller C1, and the communication device STA1 receives the BSS transition request that has been decided. That is, in a case where the communication state further degrades and the BSS transition query cannot be transmitted or the BSS transition request cannot be received, the BSS transition cannot be made, and the communication may not be capable of continuing.

Therefore, in the communication system in the present disclosure, at a stage before the communication quality degrades to an extent that the base station has to be switched immediately, a communication device STA11 (FIG. 2) acquires managing information and Link information of other base stations, and judges whether or not to make a BSS transition, or in a case of making the BSS transition, uniquely judges which BSS the transition should be made to, so as to be capable of making the BSS transition on the basis of the unique judgment.

Figure 2:
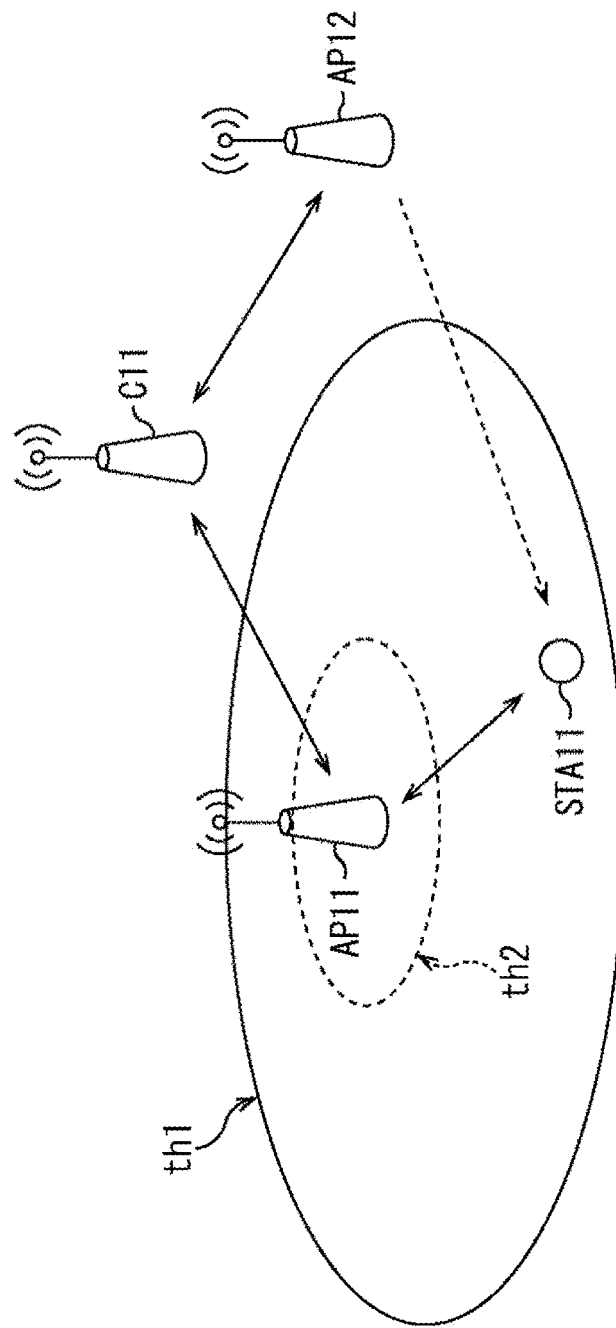
FIG. 2 is a diagram illustrating a configuration example of a communication system in the present disclosure.

More specifically, as shown in FIG. 2, by setting two types of threshold values for the BSS transition including a first threshold value th1 and a second threshold value th2, the communication device STA11 itself judges whether or not to make a BSS transition or uniquely judges which BSS a transition should be made to in a case of making the BSS transition.

Here, the first threshold value is a similar threshold value to the threshold value th of FIG. 1 described above, and it is necessary to immediately make a transition to another BSS, and which BSS the transition should be made to is entrusted to the controller C1.

On the other hand, the second threshold value th2 is a threshold value for the communication device STA11 to start selecting a BSS transition destination, and is set as a second threshold value th2 (greater than the first threshold value th1) of a state where the signal quality does not degrade as compared with that of the first threshold value th1. That is, the second threshold value th2 is set to a level at which the communication quality between the communication device STA11 and the base station AP11 does not become lower than the first threshold value th1.

In addition, when the signal quality becomes lower than the second threshold value th2, the communication device STA11 starts collecting information regarding the neighboring base stations to select a BSS transition destination, causes the neighboring base stations to respectively transmit Beacon signals placing information regarding the neighboring base stations so as to select the BSS transition destination of itself, and selects a new connection destination on the basis of the information regarding the neighboring base stations.

Then, the communication device STA11 acquires the Beacon signals transmitted from the neighboring base stations. When a base station with a better communication quality than the current one is found, the communication device STA11 make a transition of the communication connection to the base station AP2, which has the better communication quality than the current one, without transmitting a BSS transition query to the base station AP11 with which the communication connection is being established.

It is to be noted that a boundary line indicated by the first threshold value represents locations, which are distances from the base station AP11 and at which the communication quality degrades to an extent that the service related to the communication is affected. In addition, a boundary line indicated by the second threshold value represents locations, which are distances from the base station AP11, and at which the communication quality does not degrade to the extent that the service related to communication is affected, but there is a possibility that the communication quality is improved by making a transition to another base station.

By the series of actions as described above, at a stage before the degradation of the communication quality progresses to the extent that the service related to the communication is affected, a base station with a better communication quality is searched for. When such a base station is found, the BSS transition is made to the base station with a better communication quality. This configuration enables the achievement of stable communication in response to a change in the wireless LAN communication environment. It is to be noted that a controller C11, base stations AP11 and AP12, and a communication device STA11 in FIG. 2 respectively have configurations to correspond to the controller C1, the base stations AP1 and AP2, and the communication device STA1 in FIG. 1.

2. First Embodiment

<Configuration Example of Communication System in the Present Disclosure>

Next, a configuration example of a communication system in the present disclosure will be described with reference to FIG. 3.

A communication system 1 in the present disclosure includes a controller 11, base stations 12-1 and 12-2, and a communication device 13. It is to be noted that in the following description, in a case where it is not necessary to distinguish between the base stations 12-1 and 12-2, they will be simply referred to as the base station 12, and other configurations will also be referred to in a similar manner. Further, in FIG. 3, a configuration example in which only two base stations 12-1 and 12-2 are included is shown. However, except for the base station 12-1, which has established the communication connection with the communication device 13, any number of the base stations 12 may be included.

Figure 3:
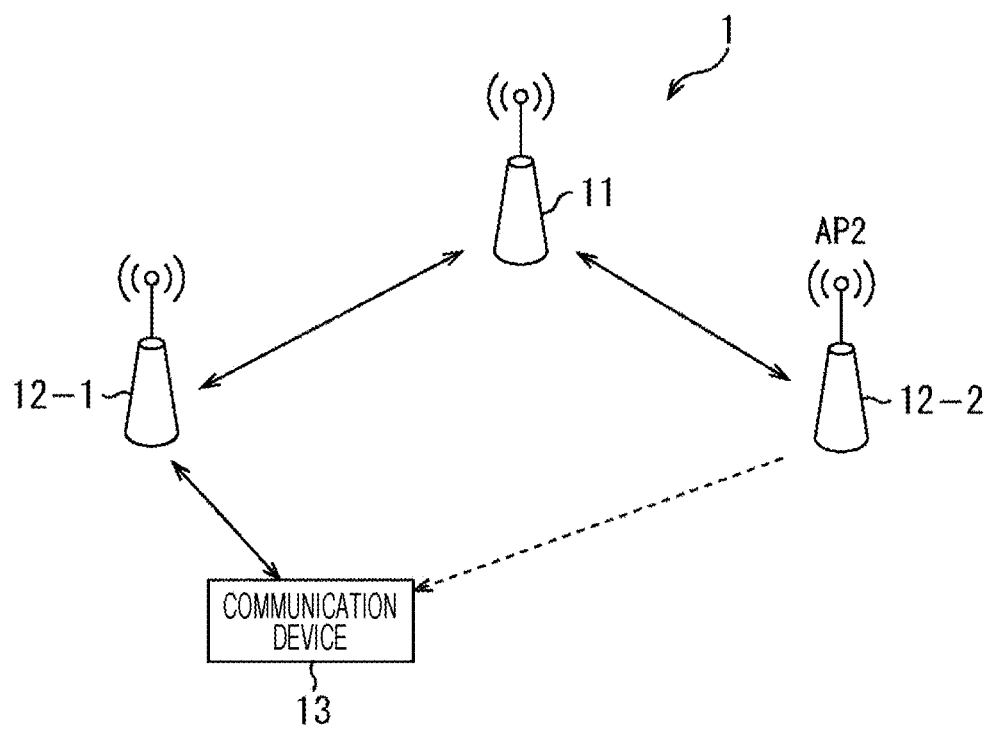
FIG. 3 is a diagram illustrating a communication system in a first embodiment in the present disclosure.

The controller 11, the base stations 12-1 and 12-2, and the communication device 13 in the communication system 1 in FIG. 3 respectively have configurations to basically correspond to the controllers C1, the base stations AP1 and AP2, and the communication device STA in FIG. 2.

It is to be noted that in FIG. 3, the communication connection between the communication device 13 and the base station 12-1 is established. The communication device 13 detects a communication quality from a DL signal from the base station 12-1, compares the communication quality with the first threshold value th1 and the second threshold value th2, which have been described with reference to FIG. 2, and determines the degree of degradation in the communication quality. In a case where the communication quality degrades as compared with the first threshold value th1, the communication device 13 transmits to the controller 11 via the base station 12-1, a BSS transition query for requesting the information regarding the base station 12, to which the transition of the communication connection should be made.

The controller 11 decides the information regarding the base station 12, to which the transition of the communication connection should be made from among the neighboring base stations 12 of the communication device 13, on the basis of the BSS transition query, and transmits a BSS connection transition request including the information regarding the base station 12, which has been decided that the transition of the communication connection should be made to, to the communication device 13 via the base station 12-1.

The communication device 13 receives the BSS connection transition request, makes a connection application on the basis of the information, regarding the base station 12 to which the transition of the communication connection should be made and included in the BSS connection transition request, and makes a transition of the communication connection.

Further, in a case where the communication quality of the communication device 13 does not degrade as much as the first threshold value th1, but degrades as compared with the second threshold value th2, the communication device 13 transmits to the controller 11 via the base station 12-1, a BSS transition judgment information request for requesting BSS transition judgment information, which is a judgment criterion used for comparing the communication qualities so as to select the base station 12 to which the transition of the communication connection should be made, to be included in the Beacon signals from the neighboring base stations 12.

The controller 11 decides the BSS transition judgment information to become a judgment criterion and to be included in the Beacon signal and transmitted, on the basis of the BSS transition judgment information request, generates a Beacon Element control notification that includes the BSS transition judgment information to become a decided judgment criterion in the Beacon signal for transmission, and transmits the Beacon Element control notification to all the base stations 12 (here, the base stations 12-1 and 12-2).

Upon reception of the Beacon Element control notification, the base station 12 generates a Beacon signal including the BSS transition judgment information to become a judgment criterion used for comparing the communication qualities in the communication device 13, on the basis of the Beacon Element control notification, and transmits the Beacon signal to the communication device 13.

Upon reception of the Beacon signals transmitted from the neighboring base stations 12, the communication device 13 compares the signal quality of the base station 12-1 with which the communication connection has already been established with the signal quality of the other base station 12-2, on the basis of the BSS transition judgment information to become a judgment criterion, included in the Beacon signals.

Then, in a case where the base station 12 that is higher in the signal quality than the base station 12-1, with which the communication connection has already been established, is found on the basis of a comparison result, the communication device 13 makes a connection application for the base station 12 that has been newly found (the base station 12-2 in FIG. 3), establishes a communication connection, and makes a BSS transition.

By a series of processes, in the communication system 1 of FIG. 3, before the communication quality with the base station 12-1, with which the communication connection has been established, degrades to the first threshold value for making the BSS transition query to the controller 11, at a timing when the threshold value degrades to the second threshold value, the communication device 13 is capable of selecting the base station 12 on the basis of the BSS transition judgment information and is capable of achieving the BSS transition.

That is, at a stage before the communication quality with the base station 12-1, with which the communication connection has been established, significantly degrades, the communication device 13 makes a comparison with the BSS transition judgment information included in the Beacon signals transmitted from the neighboring base stations 12 used as the judgment criterion, and is capable of selecting the base station 12-2 with which the optimum communication quality is obtainable for itself, so as to enable the achievement of the BSS transition.

As a result, before the degradation in the communication quality that makes the communication impossible occurs, the process of making the BSS transition to the base station 12 with a good communication quality is repeated, so that the connection with the optimum base station 12 always continues, and the achievement of the stable communication is enabled.

<Configuration Example of Controller>

Next, a configuration example of the controller 11 will be described with reference to FIG. 4.

The controller 11 includes a control unit 31, a data processing unit 32, a wireless communication unit 33, a wired communication unit 34, and a network control unit 35.

The control unit 31 includes a processor, a memory, and the like, and controls the entire action of the controller 11.

The data processing unit 32 processes a data signal used for communication. Specifically, the data processing unit 32 performs a process of generating a data signal to be placed and transmitted in a packet, and a process of extracting a data signal from a received signal that has been demodulated. The data signal described here includes both communication data exchanged with the base station 12 and control data including a control content that has been decided by the control unit 31.

The wireless communication unit 33 includes an antenna 33a, performs an analog conversion process and a radio frequency (RF) process on the data signal that has been generated by the data processing unit 32, and generates a transmission signal to be output from the antenna 33a.

Further, the wireless communication unit 33 performs an RF process and a digital conversion process on the received signal that has been received via the antenna 33a to extract a data signal.

The wireless communication unit 33 is used for communicating with the base station 12, which constitutes a network.

The wireless communication unit 33 controls the antenna unit 33a to emit a wireless packet that has been generated, as an electromagnetic wave. Further, the wireless communication unit 33 controls the antenna 33a to extract the received electromagnetic wave as a wireless packet.

The wired communication unit 34 generates a transmission signal, which is to be output to a wired cable, from the data signal that has been generated by the data processing unit 32. Further, the wired communication unit 34 extracts a data signal from the received signal that has been acquired via the wired cable.

The wired communication unit 34 is mainly used for communicating with a backhaul line and communicating with the base station 12, which constitutes the network.

It is to be noted that a plurality of wired communication units 34 and a plurality of wireless communication units 33 may be provided. For example, by providing the plurality of wired communication units 34, the connection with the backhaul and the connection with the base station 12 can be used separately. Further, the wireless communication unit 33 may have a plurality of blocks respectively corresponding to different frequencies (2.4 Ghz band/5 GHz band).

The network control unit 35 collects information such as Link information from another base station 12, which constitutes the same network, and controls the frequency and the like.

More specifically, the network control unit 35 decides a content of a BSS transition config setting and information to be placed by the base station 12 in the Beacon signal and to be transmitted to the communication device 13.

It is to be noted that the controller 11 may have any configuration, as long as it includes the network control unit 35 described above. With the provision of either the wireless communication unit 33 or the wired communication unit 34, the provision of both may not necessarily be essential. Further, in a case where the controller 11 includes the wireless communication unit 33, the controller 11 is also capable of acting as a conventional base station (an access point).

<Configuration Example of Base Station>

Next, a configuration example of the base station 12 will be described with reference to FIG. 5.

The base station 12 includes a control unit 51, a data processing unit 52, a wireless communication unit 53, a wired communication unit 54, a display unit 55, and an operation unit 56.

The control unit 51 includes a processor and a memory, and controls the entire action of the base station 12.

The control unit 51 controls the wireless communication unit 53 and the wired communication unit 54 via the data processing unit 52, and performs various processes on the basis of the signal notification of which is provided from the controller 11. Further, the control unit 51 decides a control content notification of which is provided to the controller 11 and the communication device 13.

The data processing unit 52 processes the data signal used for communication. More specifically, the data processing unit 52 generates a data signal to be placed and transmitted in a packet, and extracts a data signal from the received signal that has been demodulated.

The wireless communication unit 53 controls the antenna 53a to perform an analog conversion process and an RF process on the data signal that has been generated by the data processing unit 52, and generates and transmits a transmission signal. Further, the wireless communication unit 53 performs an RF process and a digital conversion process on the received signal that has been received via the antenna 53a, extracts the data signal, and outputs the data signal to the data processing unit 52.

The wireless communication unit 53 is used not only for communicating with the communication device 13, which is put under the control and with which the communication connection is established, but also for communicating with the controller 11, which constitutes a network.

The wireless communication unit 53 controls the antenna unit 53a to emit a wireless packet that has been generated, as an electromagnetic wave. Further, the wireless communication unit 53 acquires the electromagnetic wave that has been received via the antenna 53a, as the wireless packet.

The wired communication unit 54 generates a transmission signal to be output to the wired cable from the data signal that has been generated by the data processing unit 52, and outputs the transmission signal. Further, the wired communication unit 54 extracts a data signal from the received signal that has been acquired via the wired cable.

The wired communication unit 54 is mainly used for communicating with a backhaul line and communicating with the controller 11, which constitutes the network.

It is to be noted that a plurality of wired communication units 54 and a plurality of wireless communication units 53 may be provided. For example, a plurality of wired communication units 54 may be provided, so that the connection with the backhaul and the connection with the controller 11 may be used separately. Further, the wireless communication unit 53 may also have a plurality of blocks respectively corresponding to different frequencies (2.4 Ghz band/5 GHz band).

<Configuration Example of Communication Device>

Next, a configuration example of the communication device 13 will be described with reference to FIG. 6.

The communication device 13 includes a control unit 71, a data processing unit 72, a wireless communication unit 73, and a display unit 74.

The control unit 71 includes a processor and a memory, and controls the entire action of the communication device 13.

The control unit 71 controls the wireless communication unit 73 to detect the signal quality in communication with the base station 12-1 with which the communication connection is established, makes a comparison with the first threshold value or the second threshold value, and decides whether or not there is a BSS query or a BSS transition judgment information request.

The data processing unit 72 processes the data signal for communication. More specifically, the data processing unit 72 generates a data signal to be placed and transmitted in a packet, and extracts a data signal from the received signal that has been demodulated.

The wireless communication unit 73 controls the antenna 73a to perform an analog conversion process and an RF process on the data signal that has been generated by the data processing unit 72, and generates and transmits a transmission signal. Further, the wireless communication unit 73 performs an RF process and a digital conversion process on the received signal that has been received via the antenna 73a to extract a data signal.

The wireless communication unit 73 communicates with the base station 12, which puts under the control and with which a communication connection has been established.

The wireless communication unit 73 controls the antenna unit 73a to emit a wireless packet that has been generated, as an electromagnetic wave. Further, the wireless communication unit 73 acquires the electromagnetic wave that has been received via the antenna 73a, as a wireless packet.

The display unit 74 includes a liquid crystal display (LCD), an organic electro luminescence (EL), or the like, and is controlled by the control unit 71 to display the process results of the data processing unit 72 and various data. Further, the display unit 74 includes a touch panel, and functions as an operation unit. That is, the display unit 74 generates an operation signal according to an operation content on a keyboard, operation buttons, and the like to be displayed, and outputs an operation signal to the control unit 71.

<Communication Control Process>

Next, a first communication control process by the communication system 1 of FIG. 3 will be described with reference to the flowchart of FIG. 7. It is to be noted that in the communication control process in the flowchart of FIG. 7, it is assumed as a precondition that the communication connection between the base station 12-1 and the communication device 13 in FIG. 3 is in an established state.

In step S11, the control unit 31 of the controller 11 controls the network control unit 35 to decide a content of the BSS transition config setting, and also causes the data processing unit 32 to generate the BSS transition config setting, and uses either the wireless communication unit 33 or the wired communication units 34 to transmit the BSS transition config setting to the base stations 12-1 and 12-2.

<BSS Transition Config Setting Frame to be Transmitted from Controller to Base Station>

Figure 8:
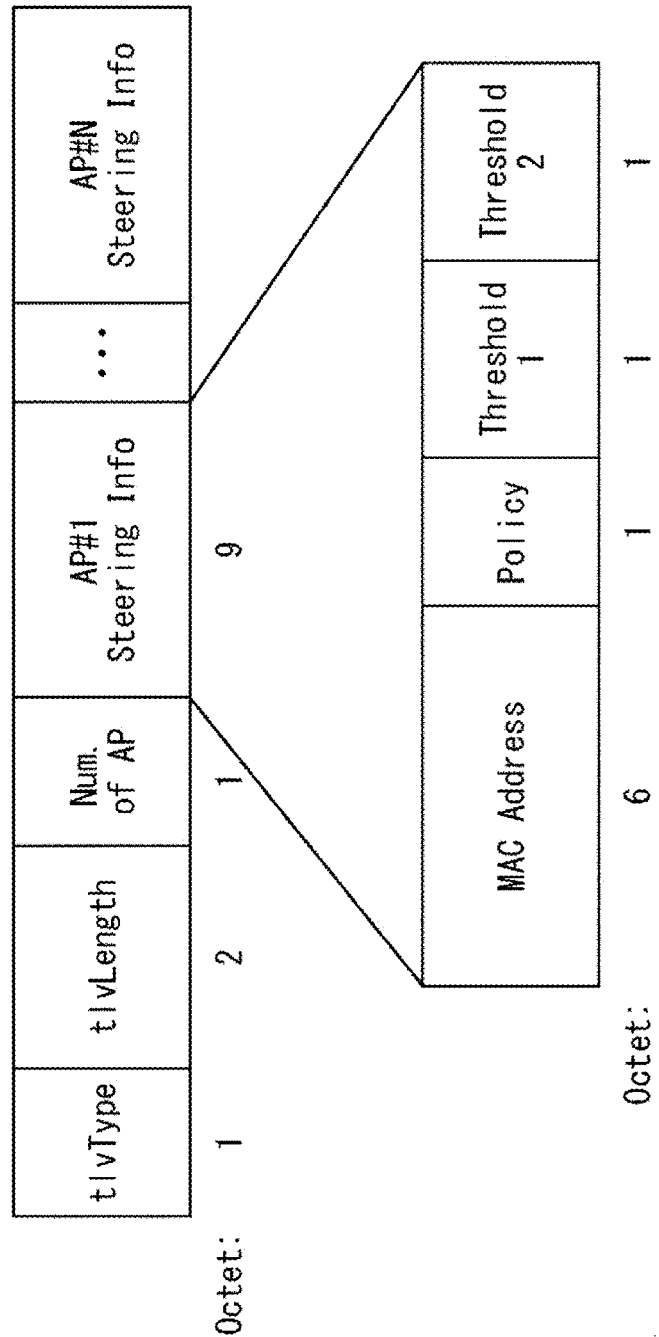
FIG. 8 is a diagram illustrating a configuration of a BSS transition config setting frame transmitted from a controller to a base station.

A BSS transition config setting frame to be transmitted from the controller 11 to the base stations 12-1 and 12-2 has, for example, a configuration shown in FIG. 8.

In the BSS transition config setting frame of FIG. 8, from the left in the upper level in the figure, tlvType of one Octet, tlvLength of two Octets, Num. of AP of one Octet, and AP #1 Steering Info., to AP #N Steering Info each being nine Octets are stored.

tlvType is information of a TLV format type, and tlvLength is information has a data length in a TLV format. In addition, Num. of AP is information regarding the number of the base stations 12 (the number of the access points (APs)). Furthermore, in AP #N Steering Info., information regarding each base station is recorded, and MAC Address, Policy, Threshold 1, and Threshold 2 are stored as indicated in the lower level of FIG. 8.

MAC Address is a physical address of the base station 12 to be identified by AP #N from among the base stations 12. Policy is information used for designating a device capable of starting a BSS transition process and a type of information to become a judgment criterion (a judgment parameter).

Policy is, for example, in existing specifications, information regarding whether or not the communication device 13 is capable of judging the BSS transition with the RSSI (the received electric power) used as the judgment criterion, whether or not the base station 12 is capable of judging the BSS transition with the RSSI (the received electric power) used as the judgment criterion, and the like is represented as either ON or OFF each being 1-bit information.

In addition, Policy is not limited to the existing specifications, and information for specifying the type of information to become a judgment criterion (the judgment parameter) of the signal quality may be added. In addition to the RSSI (the received electric power), which is a conventional judgment criterion, for example, a packet success rate, a standby period, and the like may be added as the type of information to become the judgment criterion.

Further, Policy may be extended to indicate ON or OFF of the determinations using the first threshold value and the second threshold value. Further, regarding Policy, information indicating any one method may be stored, instead of ON or OFF each being 1-bit information.

Threshold 1 and Threshold 2 respectively store information corresponding to the first threshold value th1 and the second threshold value th2, which have been described with reference to FIG. 2.

It is to be noted that the example in which the two threshold values are set has been described in FIG. 2. However, the number of the threshold values may be three or more. For example, in a case of three, Threshold 1 to Threshold 3 will be set.

It is to be noted that the size of each field in the BSS transition config setting frame shown in FIG. 8 is the unit of Octet represented below each field in the figure. Hereinafter, a similar configuration will be applicable, unless otherwise specified. Further, the size of each field may be not only the size shown in FIG. 8 but also another size.

Figure 7:
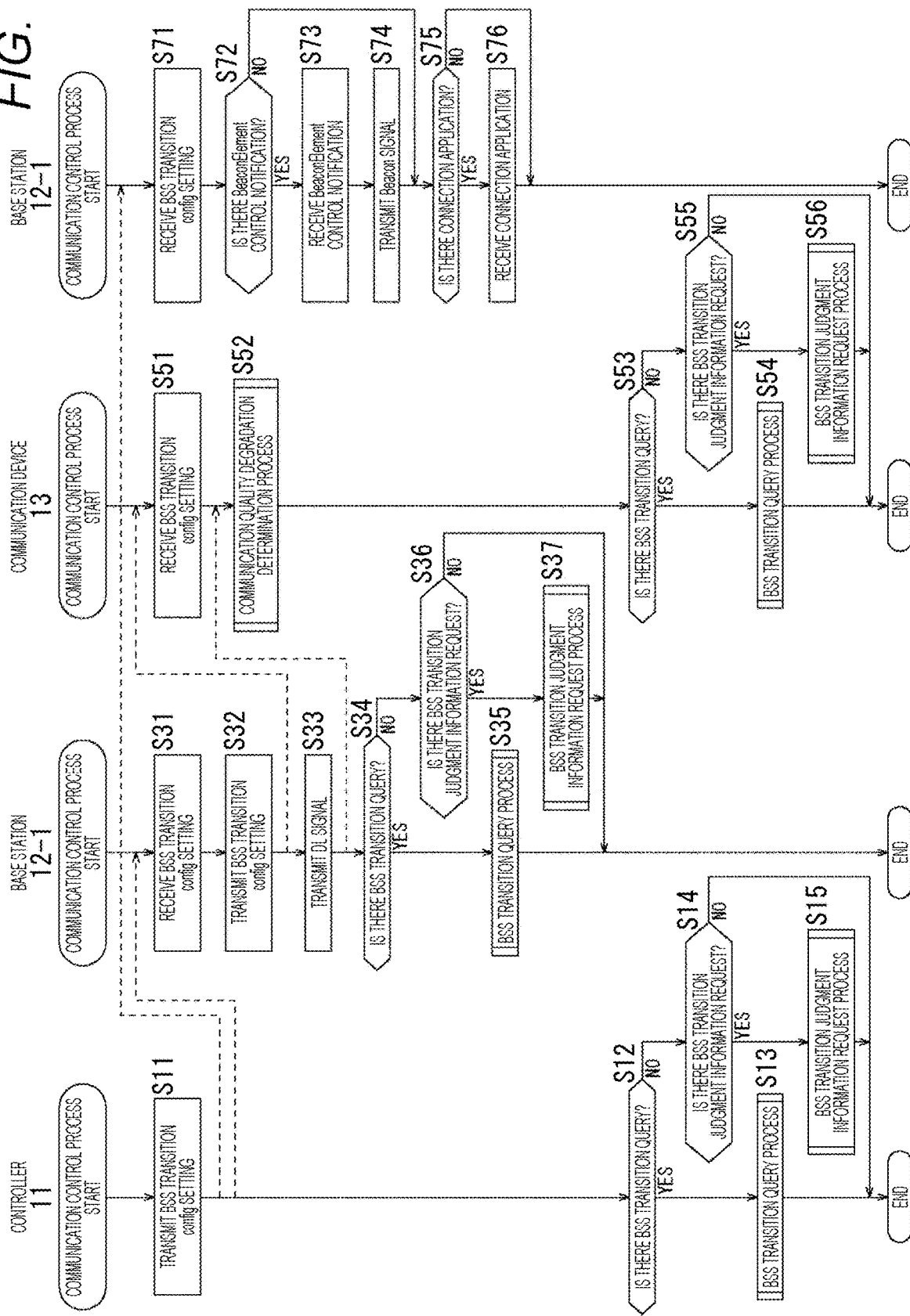
FIG. 7 is a flowchart illustrating a communication control process by the communication system of FIG. 3.

Here, the description returns to the flowchart of FIG. 7.

In steps S31 and S71, the control units 51 of the base stations 12-1 and 12-2 each control the data processing unit 52 to receive the BSS transition config setting, which includes the BSS transition config setting frame that has been described with reference to FIG. 8, and which is transmitted by the wireless communication unit 53 or the wired communication unit 54.

Then, the control unit 51 sets the type of information to become a judgment criterion for the signal quality for judging whether or not the BSS transition query or the BSS transition judgment information request is necessary in the communication device 13 on the basis of the BSS transition config setting that has been received, a threshold value for making the BSS transition query (corresponding to the first threshold value in FIG. 2), and a threshold value for making the BSS transition judgment information request (corresponding to the second threshold value in FIG. 2).

In step S32, the control unit 51 of the base station 12-1 controls the data processing unit 52 to generate a BSS transition config setting for the communication device 13 on the basis of the BSS transition config setting that has been received, and causes the wireless communication unit 53 to transmit the BSS transition config setting to the communication device 13.

<BSS Transition Config Setting Frame to be Transmitted from Base Station to Communication Device>

Figure 9:
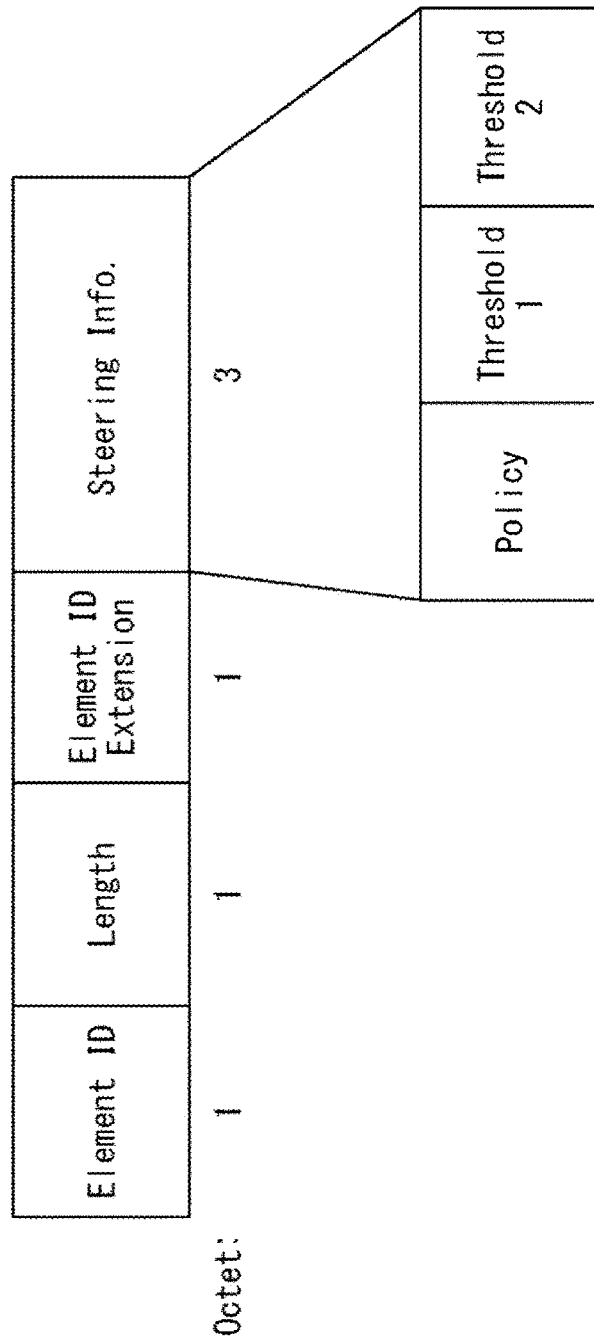
FIG. 9 is a diagram illustrating a configuration of a BSS transition config setting frame transmitted from the base station to the communication device.

A BSS transition config setting frame transmitted from the base station 12-1 to the communication device 13 has a configuration as shown in FIG. 9, for example.

In the BSS transition config setting frame in FIG. 9, from the left in the upper level in the figure, Element ID of one Octet, Length of one Octet, Element ID Extention of one Octet, and Steering Info. of three Octets are stored.

Element ID is identifier information for identifying the BSS transition config setting frame, and Length is information regarding a data length.

Element ID Extention is an extension of an identifier for identifying the BSS transition config setting frame.

In Steering Info., as indicated at the lower level of FIG. 9, information similar to Policy, Threshold 1, and Threshold 2, which are MAC Address and subsequent information in AP #N Steering Info. in the BSS transition config setting frame that has been described with reference to FIG. 8, are stored.

In step S51, the control unit 71 of the communication device 13 controls the data processing unit 72 so that the wireless communication unit 73 receives the BSS transition config setting transmitted from the base station 12-1.

Here, the control unit 71 sets information or a threshold value to become a judgment criterion for judging the communication quality of the base station 12-1, with which the communication connection has been established, on the basis of the BSS transition config setting that has been received.

In step S33, the control unit 51 of the base station 12-1 controls the data processing unit 52 to transmit a download (DL) signal from the wireless communication unit 53 to the communication device 13.

In step S52, the control unit 71 of the communication device 13 receives the DL signal that has been transmitted from the base station 12-1 on the basis of the BSS transition config setting, performs a communication quality degradation determination process, and determines a degradation in the communication quality.

<Communication Quality Degradation Determination Process>

Figure 10:
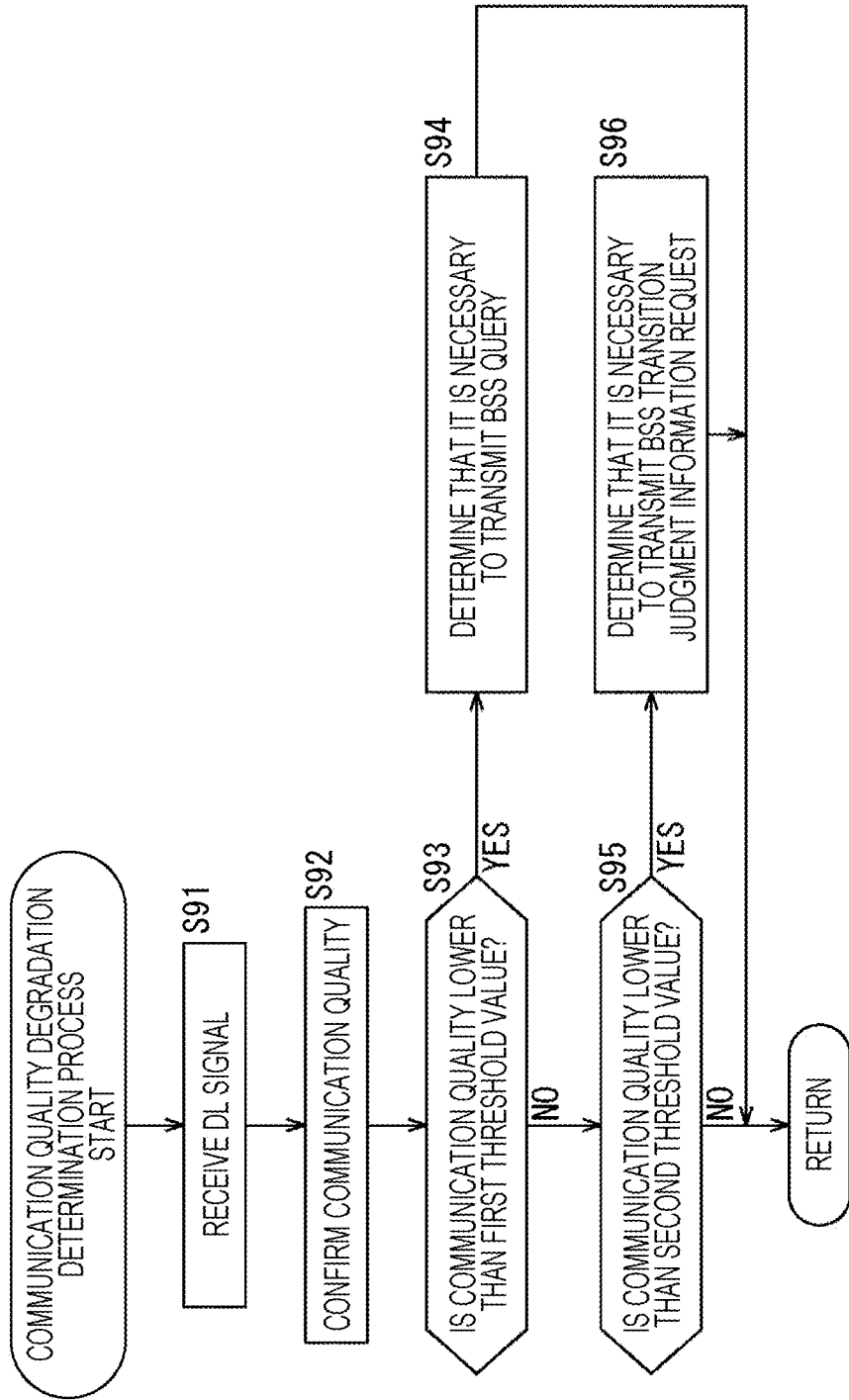
FIG. 10 is a flowchart illustrating a communication quality degradation determination process by the communication device in FIG. 3.

Here, a communication quality degradation determination process will be described with reference to the flowchart of FIG. 10.

In step S91, the control unit 71 of the communication device 13 controls the data processing unit 72 so that the wireless communication unit 73 receives the DL signal transmitted from the base station 12-1.

In step S92, when receiving the DL signal, the control unit 71 confirms the signal quality of, for example, the RSSI on the basis of the BSS transition config setting.

In step S93, the control unit 71 determines whether or not the signal quality is lower than the first threshold value on the basis of the BSS transition config setting, that is, whether or not it is necessary to transmit the BSS transition query immediately.

In a case where the communication quality is considered to be lower than the first threshold value in step S93, the process proceeds to step S94.

In step S94, the control unit 71 determines that it is necessary to transmit the BSS transition query.

Further, in a case where it is considered in step S93 that the signal quality is not lower than the first threshold value, the process proceeds to step S95.

In step S95, the control unit 71 determines whether or not the signal quality is lower than the second threshold value. That is, it is not necessary to make the BSS transition query immediately, but the control unit 71 determines whether or not it is necessary to request the BSS transition judgment information for judging a BSS transition in a case where there is a BSS with a high signal quality.

In a case where the communication quality is considered to be lower than the second threshold value in step S95, the process proceeds to step S96.

In step S96, the control unit 71 determines that it is necessary to transmit the BSS transition judgment information request.

That is, in the communication quality degradation determination process, in response to the communication quality, it is determined whether the BSS transition query, which is a query for immediately making a BSS transition, is transmitted, or whether the BSS transition judgment information request for judging the BSS transition is transmitted, in a case where there is a BSS with a high signal quality.

Here, the description returns to the flowchart of FIG. 7.

In step S53, the control unit 71 determines whether or not it is determined that it is necessary to transmit the BSS transition query, in the communication quality degradation determination process.

In a case where it is determined in step S53 that it is necessary to transmit the BSS transition query, the process proceeds to step S54.

In step S54, the control unit 71 performs a BSS transition query process, transmits the BSS transition query to the controller 11 via the base station 12-1, acquires the information regarding the BSS to become a transition destination, and performs the BSS transition.

It is to be noted that the BSS transition query process will be described in detail later with reference to the flowchart of FIG. 11.

Further, in step S53, in a case where the communication device 13 determines that it is necessary to transmit the BSS transition query, the BSS transition query is transmitted to the controller 11 via the base station 12-1 in the process of step S54, and the information regarding the BSS (the base station 12) to become a transition destination is transmitted from the controller 11 via the base station 12-1.

Therefore, in subsequent processes, both in the process of step S34 by the base station 12-1 and in the process of step S12 by the controller 11, it is considered that there is a BSS transition query. The processes respectively proceed to steps S35 and S13, and the controller 11 and the base station 12-1 respectively perform the BSS transition query processes.

Therefore, regarding the BSS transition query process, the details of the respective processes of the controller 11, the base stations 12-1 and 12-2, and the communication device 13 will be described later with reference to the flowchart of FIG. 11.

On the other hand, in a case where it is determined in step S53 that it is not necessary to transmit the BSS transition query, the process proceeds to step S55.

In step S55, the control unit 71 determines whether or not it has been determined that it is necessary to transmit the BSS transition judgment information request, in the communication quality degradation determination process.

In a case where it is determined in step S55 that it is necessary to transmit the BSS transition judgment information request, the process proceeds to step S56.

In step S56, the control unit 71 performs a BSS transition judgment information request process, transmits the BSS transition judgment information request to the controller 11 via the base station 12-1, and compares the communication quality of the neighboring base station 12 with the communication quality of the base station 12-1 with which the communication connection is currently established, on the basis of the BSS transition judgment information included in the Beacon signal transmitted from the neighboring base station 12, and makes a BSS transition as necessary.

It is to be noted that the details of the BSS transition judgment information request process will be described later with reference to the flowchart of FIG. 12.

Further, in step S55, in a case where the communication device 13 determines that it is necessary to transmit the BSS transition judgment information request, the BSS transition judgment information request is transmitted to the controller 11 via the base station 12-1 in the process of step S56.

Therefore, in subsequent processes, also in steps S34 and S12, the processes are performed after the BSS transition judgment information request have been supplied. Therefore, the processes respectively proceed to steps S36 and S14. Further, the BSS transition judgment information request process is performed, so that the BSS transition judgment information request processes are also performed respectively by the controller 11 and the base station 12-1 in the processes of steps S37 and S15.

Therefore, regarding the BSS transition judgment information request process, the details of the respective processes of the controller 11, the base stations 12-1 and 12-2, and the communication device 13 will be described later with reference to the flowchart of FIG. 12.

It is to be noted that regarding the process of step S72 and subsequent processes by the base station 12-2 in FIG. 7, similar flowcharts are respectively included in the flowcharts of FIGS. 11 and 12, and the description will be given to correspond to one another.

Then, in step S55, in a case where it is considered that the BSS transition judgment information request is not necessary, the process ends.

Therefore, similar processes are respectively performed by the controller 11 and the base station 12-1, and it is considered in each step S14 or S36 that neither the BSS query nor the BSS transition judgment information request is present, and the processes end.

By the above-described series of processes, when the signal quality becomes lower than the first threshold value as described with reference to FIG. 2, the BSS query is transmitted, and the BSS transition is made in response to the BSS transition request that has been decided by the controller 11. In addition, when the signal quality becomes lower than the second threshold value, which is lower in the degradation degree than the first threshold value, the BSS transition judgment information request is transmitted. The signal quality of the base station 12-1 with which the communication connection is established and the signal quality of the neighboring base station 12-2 are compared with each other, on the basis of the BSS transition judgment information included in the Beacon signal, and the BSS transition according to the comparison result is made.

Consequently, in a state in which the communication quality does not degrade as compared with a case of making the BSS transition query after the situation in which the BSS transition is immediately necessary occurs, the BSS transition is enabled on the basis of the BSS transition judgment information at a stage of having found a base station 12 with a better communication quality, from among the neighboring base stations 12, than the communication quality of the current base station 12.

As a result, in a case where the communication quality degrades to the extent that the BSS transition is immediately necessary, and then the BSS transition is performed by the BSS transition query, it is possible to prevent a situation in which the BSS transition query becomes impossible, and an appropriate BSS transition becomes impossible. The achievement of the stable communication is enabled in response to a change in the wireless LAN communication environment.

<BSS Transition Query Process>

Next, the BSS transition query process will be described with reference to the flowchart of FIG. 11.

In step S121, the control unit 71 of the communication device 13 controls the data processing unit 72 so that the wireless communication unit 73 transmits a BSS transition query to the base station 12-1.

In step S111, the control unit 51 of the base station 12-1 controls the data processing unit 52 so that the wireless communication unit 53 receives the BSS transition query from the communication device 13.

More specifically, the control unit 51 of the base station 12-1 recognizes that there is the BSS transition query in step S34 (FIG. 7) from the BSS transition query to be received here. The process proceeds to step S35 (FIG. 7), and the BSS transition query process is started.

In step S112, the control unit 51 of the base station 12-1 controls the data processing unit 52 so that either the wireless communication unit 53 or the wired communication unit 54 transmits the BSS transition query from the communication device 13 to the controller 11.

In step S101, the control unit 31 of the controller 11 controls the data processing unit 32 so that either the wireless communication unit 33 or the wired communication unit 34 receives the BSS transition query from the communication device 13 via the base station 12-1.

More specifically, the control unit 31 of the controller 11 recognizes that there is the BSS transition query in step S12 (FIG. 7) from the BSS transition query to be received here. The process proceeds to step S13 (FIG. 7), and the BSS transition query process is started.

In step S102, the control unit 31 controls the network control unit 35 to decide that the base station 12 is a transition destination, to which the communication device 13 that has transmitted the BSS transition query should make a transition to establish the communication connection.

In step S103, the control unit 31 controls the data processing unit 32 so that either the wireless communication unit 33 or the wired communication unit 34 transmits information regarding the transition destination that is the information regarding the base station 12, with which the communication device 13 should make a transition to establish the communication connection, to the base station 12-1, with which the communication device 13 is currently establishing the communication connection.

In step S113, the control unit 51 of the base station 12-1 controls the data processing unit 52 so that either the wireless communication unit 53 or the wired communication unit 54 receives the information regarding the transition destination that is transmitted from the controller 11 and that is the information regarding the base station 12, with which the communication device 13 should make a transition to establish the communication connection.

In step S114, the control unit 51 of the base station 12-1 controls the data processing unit 52 to generate a BSS transition destination request including the information regarding the base station 12, with which the communication device 13 should make a transition to establish communication, and causes the wireless communication unit 53 to transmit the BSS transition request to the communication device 13.

In step S122, the control unit 71 of the communication device 13 controls the data processing unit 72 so that the wireless communication unit 73 receives the BSS transition request transmitted from the base station 12-1.

In step S123, the control unit 71 of the communication device 13 controls the data processing unit 72 to generate a BSS transition response corresponding to the BSS transition request transmitted from the base station 12-1, and causes the wireless communication unit 73 to transmit the BSS transition response to the base station 12-1.

In step S115, the control unit 51 of the base station 12-1 controls the data processing unit 52 so that the wireless communication unit 53 receives the BSS transition response transmitted from the communication device 13.

In step S124, the control unit 71 of the communication device 13 controls the data processing unit 72 so that the wireless communication unit 73 transmits, to the corresponding base station 12-2, a connection application on the basis of the information regarding the base station 12, to become a transition destination, included in the BSS transition request.

In step S75, the control unit 51 of the base station 12-2 controls the data processing unit 52 to determine whether or not the connection application that had been transmitted from the communication device 13 has been received by the wireless communication unit 53. In a case where the connection application is received, the process proceeds to step S76.

In step S76, the control unit 51 of the base station 12-2 controls the data processing unit 52 to receive the connection application on the basis of the connection application that has been received by the wireless communication unit 53, and to stablish connection communication with the communication device 13.

By the above process, in a case where the communication quality is lower than the first threshold value and it is necessary that the communication device 13 make a transition of the base station 12 immediately, the BSS transition query is transmitted to controller 11 via the base station 12-1 with which the connection communication is established. The controller 11 decides the transition destination, generates BSS transition request information on the basis of the transition destination, and transmits the BSS transition request information to the communication device 13. Then, the communication device 13 receives the BSS transition request information, and the BSS transition to a new base station 12-2 with a high communication quality included in the BSS transition request information is achieved.

It is to be noted that the process of steps S72 to S74 will be described in detail later with reference to the flowchart of FIG. 12.

<BSS Transition Judgment Information Request Process>

Next, the BSS transition judgment information request process will be described with reference to the flowchart of FIG. 12.

In step S151, the control unit 71 of the communication device 13 controls the data processing unit 72 to generate a BSS transition judgment information request, and causes the wireless communication unit 73 to transmit the BSS transition judgment information request to the base station 12-1 to the communication device 13.

<BSS Transition Judgment Information Request Frame to be Transmitted from Communication Device to Base Station>

Figure 13:
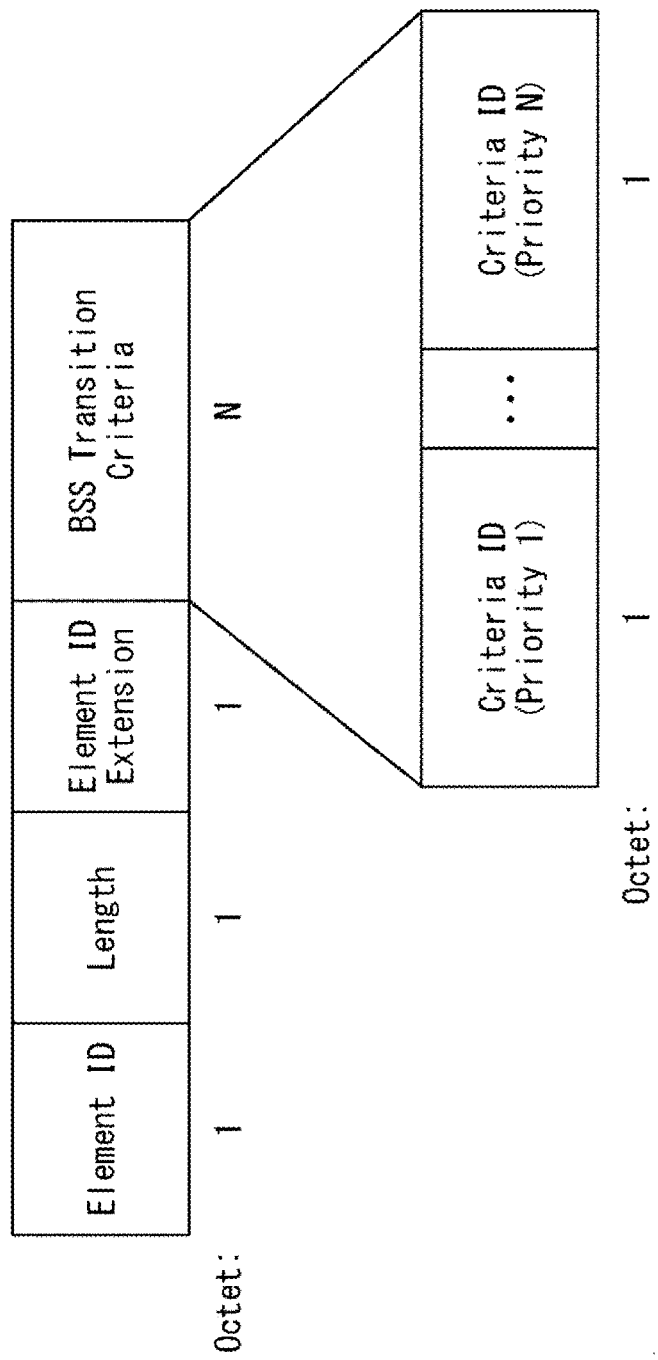
FIG. 13 is a diagram illustrating a configuration of a BSS transition judgment information request frame transmitted from the communication device to the base station.

A BSS transition judgment information request frame transmitted from the communication device 13 to the base station 12-1 has a configuration as shown in FIG. 13, for example.

In the BSS transition judgment information request frame in FIG. 13, from the left in the upper level in the figure, Element ID of one Octet, Length of one Octet, Element ID Extention of one Octet, and the BSS Transition Criteria of N Octets are stored.

Element ID is information of an identifier for identifying the BSS transition judgment information request frame, and Length is information regarding a data length.

Element ID Extention is an extension of the identifier of the BSS transition judgment information request frame, and stores information indicating whether or not BSS Transition Criteria is stored.

As shown in the lower level of FIG. 13, in BSS Transition Criteria, identifiers for designating information necessary for transmission by being placed (included) in a Beacon signal transmitted from the base station 12 are stored in the order of priority, as criteria used for selecting the base station 12 to become a BSS transition destination. In FIG. 13, the priority is higher on the left, and Criteria ID is stored in association with a Criteria ID (Priority 1), Criteria ID (Priority 2), . . . each having one Octet as an identifier of information to become a judgment criterion. In FIG. 13, the criteria corresponding to N pieces are stored.

That is, the BSS transition judgment information request frame includes the judgment criteria, which are necessary for the communication device 13 to make a BSS transition judgment and which are requested to be placed in the Beacon signal, and the information for specifying the priorities. It is to be noted that the judgment criteria which are requested to be placed in the Beacon signal, and the priorities may be optionally set by a user who uses the transmission device 13.

In step S141, the control unit 51 of the base station 12-1 controls the data processing unit 52 so that the wireless communication unit 53 receives the BSS transition judgment information request from the communication device 13.

More specifically, the control unit 51 of the base station 12-1 recognizes that there is the BSS transition judgment information request in step S36 (FIG. 7) from the BSS transition judgment information request to be received here. The process proceeds to step S37 (FIG. 7), and the BSS transition judgment information request process is started.

In step S142, the control unit 51 of the base station 12-1 controls the data processing unit 52 to generate a BSS transition judgment information request for the controller 11 on the basis of the BSS transition judgment information request from the communication device 13, and causes either the wireless communication unit 53 or the wired communication unit 54 to transmit the BSS transition judgment information request to the controller 11.

<BSS Transition Judgment Information Request Frame to be Transmitted from Base Station to Controller>

Figure 14:
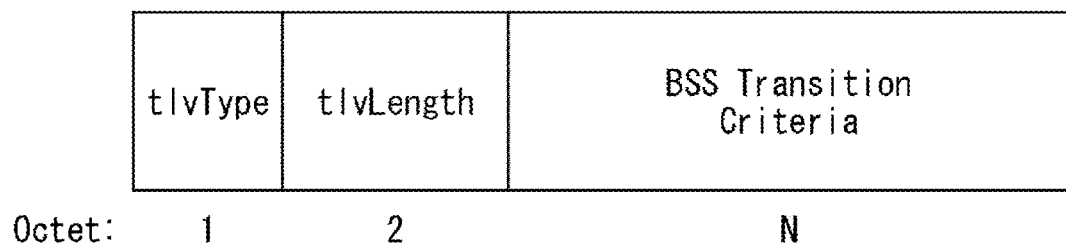
FIG. 14 is a diagram illustrating a configuration of a BSS transition judgment information request frame.

The BSS transition judgment information request frame to be transmitted from the base station 12-1 to the controller 11 has, for example, a configuration example as shown in FIG. 14.

In the BSS transition judgment information request frame in FIG. 14, from the left in the upper level in the figure, tlvType of one Octet, tlvLength of two Octets, and BSS Transition Criteria of N Octets are stored.

tlvType is information of a TLV format type, and tlvLength is information has a data length in a TLV format. It is to be noted that BSS Transition Criteria of N Octets is similar to BSS Transition Criteria in the BSS transition judgment information request frame transmitted from the communication device 13 in FIG. 13 to the base station 12-1. Therefore, the description thereof will be omitted.

In step S131, the control unit 31 of the controller 11 controls the data processing unit 32 so that either the wireless communication unit 33 or the wired communication unit 34 receives the BSS transition judgment information request from the base station 12-1.

More specifically, the control unit 31 of the controller 11 recognizes that there is a BSS transition judgment information request in step S14 (FIG. 7) from the BSS transition judgment information request to be received here. The process proceeds to S15 (FIG. 7), and the BSS transition judgment information request process is started.

In step S132, the control unit 31 controls the network control unit 35 to decide the BSS transition judgment information that should be placed in a Beacon on the basis of the BSS transition judgment information request and transmitted to the communication device 13, that is, the judgment criteria for judging the BSS transition.

In step S133, the control unit 31 controls the data processing unit 32 to generate a Beacon Element control notification on the basis of the BSS transition judgment information that has been decided, and causes either the wireless communication units 33 or the wired communication unit 34 to transmit the Beacon Element control notification to all the base stations 12-1 and 12-2.

<Beacon Element Control Notification Frame>

Figure 15:
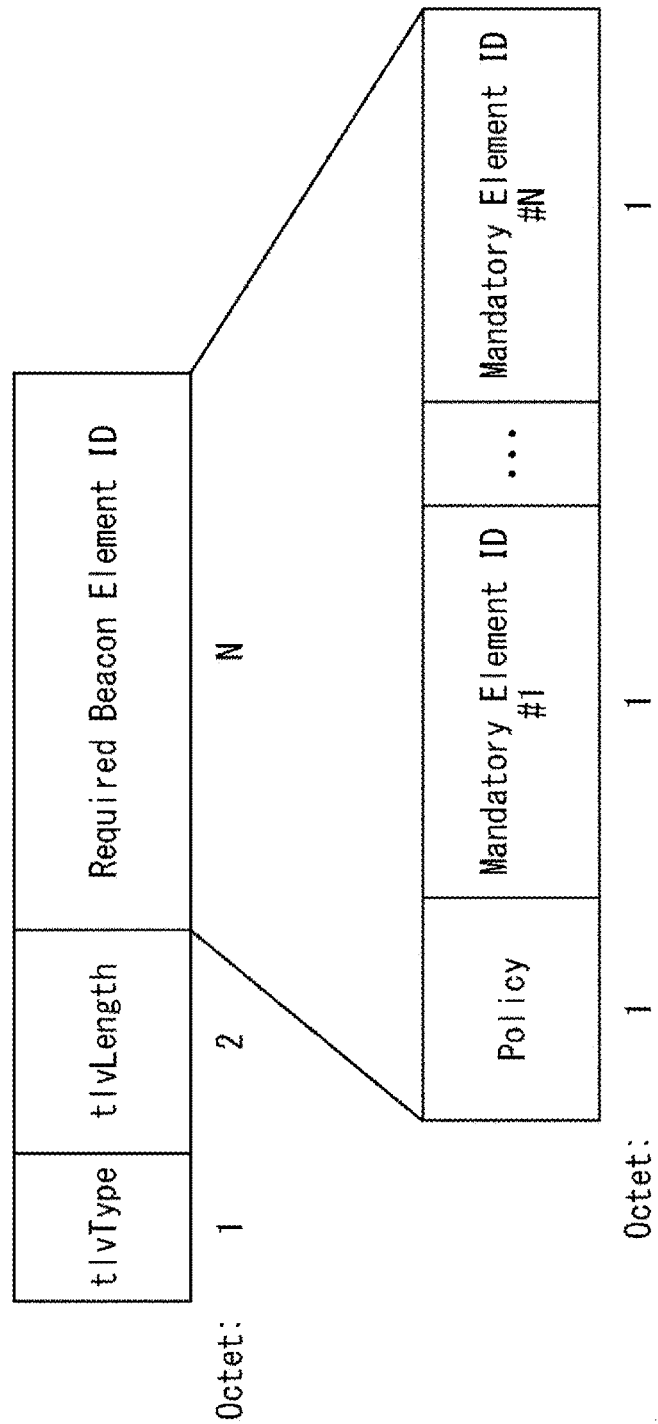
FIG. 15 is a diagram illustrating a configuration of a Beacon Element control notification frame transmitted from the controller to the base station.

A Beacon Element control notification frame transmitted from the controller 11 to the base stations 12-1 and 12-2 has, for example, a configuration example as shown in FIG. 15.

In the Beacon Element control notification frame in FIG. 15, from the left in the upper level in the figure, tlvType of one Octet, tlvLength of two Octets, and Required Beacon Element ID of N Octets are stored.

In Required Beacon Element ID, an identifier for specifying the judgment criteria to become the BSS transition judgment information. From the left in the lower level in the figure of FIG. 15, Policy, Mandatory Element ID #1, Mandatory Element ID #2, . . . are stored.

In Policy, information regarding a control policy is stored. As a control policy, a timing or a period including Required Beacon Element ID in a Beacon signal are set. The timing or the period is set such that, for example, "Required Beacon Element ID is always included continuously", "Required Beacon Element ID is included only during a given period", "Required Beacon Element ID is included only at a given interval", and the like.

Mandatory Element ID #N is information regarding an identifier in the Beacon signal corresponding to Criteria ID in BSS Transition Criteria in the BSS transition judgment information request.

That is, in the BSS transition judgment information request, Criteria ID is set as an identifier for identifying the judgment criteria that is the BSS transition judgment information. On the other hand, Element ID (Required Beacon Element ID) is set for an identifier regarding the information to be included in the Beacon signal.

Therefore, for example, the network control unit 35 stores, for example, a Beacon Element decision table in which a Criteria ID and an Element ID (Required Beacon Element ID) are associated with each other as shown in FIG. 16, and in generating a Beacon Element control notification frame, refers to the Beacon Element decision table, reads a Required Beacon Element ID corresponding to Criteria ID of the BSS transition judgment information request, and stores as Mandatory Element ID #N.

That is, in the Beacon Element decision table of FIG. 16, Criteria ID=1 indicates that a judgment criterion (Criteria) is the RSSI (the received electric power), but indicates that there is no identifier (Required Beacon Element ID) in particular for identifying the information regarding the judgment criterion stored in the corresponding Beacon signal. That is, in the Beacon signal, the RSSI (the received electric power) is measured by default at the time of signal reception, no identifier is set in particular.

In addition, Criteria ID=2 indicates that information to become a judgment criterion (Criteria) is BSS Load (BSS load), but 28 is an identifier (Required Beacon Element ID) as the judgment criterion stored in the corresponding Beacon signal. It is indicated that the information to become the judgment criterion is BSS Load.

Furthermore, Criteria ID=3 indicates that a judgment criterion (Criteria) is Access Delay, but 39 is an identifier (Required Beacon Element ID) as the judgment criterion stored in the corresponding Beacon signal. It is indicated that the information to become the judgment criterion is BSS Average Access Delay.

In addition, Criteria ID=4 indicates that a judgment criterion (Criteria) is a quality of signal (QOS), but 35 is an identifier (Required Beacon Element ID) as the judgment criterion stored in the corresponding Beacon signal. It is indicated that the information to become the judgment criterion is QOS Capability.

In addition, in the Mandatory Element ID #1, Mandatory Element ID #2, . . . , identifiers (Required Beacon Element ID) for identifying the information regarding the judgment criteria are arranged in the order according to the priority in a similar manner to Criteria ID (Priority 1), Criteria ID (Priority 2), . . . in the BSS transition judgment information request frame transmitted from the communication device 13 to the base station 12-2 that has been described with reference to FIG. 13. As a result, for example, in FIG. 15, the information to become the judgment criterion specified by Mandatory Element ID #1 has the first highest priority, and the information to become the judgment criterion specified by Mandatory Element ID #2 has the second highest priority. That is, the information regarding Mandatory Element ID #N has a higher priority, as the degree of N is smaller, and has a lower priority as the degree of N is larger.

That is, the base station 12, which has received the Beacon Element control notification, confirms Mandatory Element ID #N included in Required Beacon Element ID, recognizes which of the BSS transition judgment information at what priority is included for transmission.

In step S143, the control unit 51 of the base station 12-1 controls the data processing unit 52 so that either the wireless communication unit 53 or the wired communication unit 54 receives the Beacon Element control notification transmitted from the controller 11.

In step S144, the control unit 51 of the base station 12-1 controls the data processing unit 52 to generate a Beacon frame on the basis of the Beacon Element control notification, and causes the wireless communication unit 53 to transmit the Beacon frame as a Beacon signal to the communication device 13.

<Beacon Frame>

Figure 17:
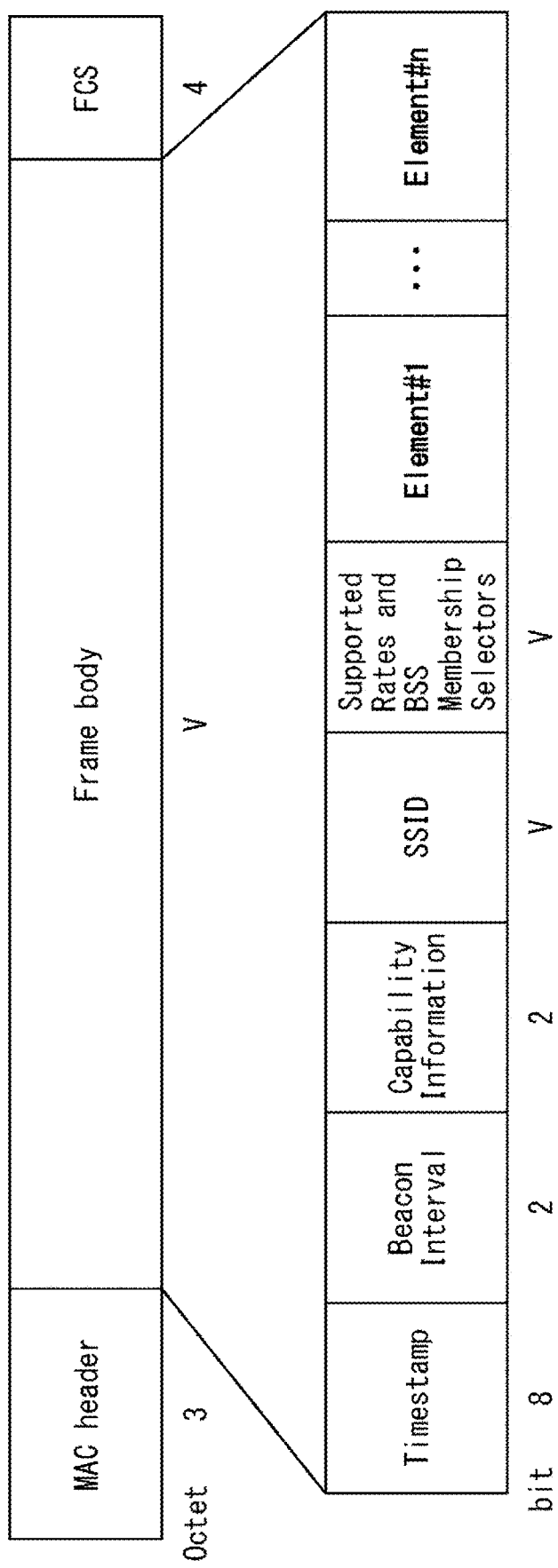
FIG. 17 is a diagram illustrating a configuration of a Beacon frame.

The Beacon frame transmitted from the base station 12 to the communication device 13 has a configuration as shown in FIG. 17, for example.

In the Beacon frame of FIG. 17, from the left in the upper level in the figure, MAC header of three Octets, Frame Body of a variable length (V), and FCS of four Octets are stored.

In MAC header, information such as a frame type, a transmission timing, a reception destination address, a transmission destination address, and the like are stored.

Frame Body includes actual data to be transmitted, and includes from the left in the lower level in the figure, Timestamp of eight bits, Beacon Interval of two bits, Capability Information of two bits, SSID of a variable length, Supported Rates and BSS Membership Selectors of a variable length, and Element #1, . . . Element #n.

In Timestamp, time information used for synchronizing the communication being conducted between the base station 12 and the communication device 13 is stored.

Further, in Beacon Interval, a time interval in which the Beacon signal is transmitted is stored.

In Capability Information, basic Capability information regarding the base station 12 is stored. In SSID, information for identifying the base station 12 is stored.

In Supported Rates and BSS Membership Selectors, information regarding supported communication rates is stored.

In Element #n, information corresponding to Mandatory Element ID #N in Required Beacon Element ID in the Beacon Element control notification is stored, and as N is smaller, the priority is set to be higher.

In frame check sequence (FCS), an error correction code is stored.

It is to be noted that in the base station 12-2 with which the communication connection is not currently established, in step S72, the control unit 51 controls the data processing unit 52 so that either the wireless communication unit 53 or the wired communication unit 54 determines whether or not the Beacon Element control notification has been transmitted from the controller 11. In a case where it is considered in step S72 that the Beacon Element control notification has been transmitted, the process proceeds to step S73.

In step S73, the control unit 51 of the base station 12-2 controls the data processing unit 52 so that either the wireless communication unit 53 or the wired communication unit 54 receives the Beacon Element control notification transmitted from the controller 11.

In step S74, the control unit 51 of the base station 12-2 controls the data processing unit 52 to generate a Beacon frame on the basis of the Beacon Element control notification, and causes the wireless communication unit 53 to transmit the Beacon frame as a Beacon signal to the communication device 13.

That is, by the process heretofore, the Beacon signals each including the information to become the judgment criterion to become BSS transition judgment information that has been specified by Criteria ID requested from the communication device 13 on the basis of the BSS transition judgment information request from the communication device 13 are transmitted from the neighboring base stations 12-1 and 12-2 to the communication device 13.

In step S152, the control unit 71 of the communication device 13 controls the data processing unit 72 so that the wireless communication unit 73 receives the Beacon signals respectively transmitted from the base stations 12-1 and 12-2, and a communication quality comparison process is performed on the basis of the Beacon signal that has been received.

<Communication Quality Comparison Process>

Figure 18:
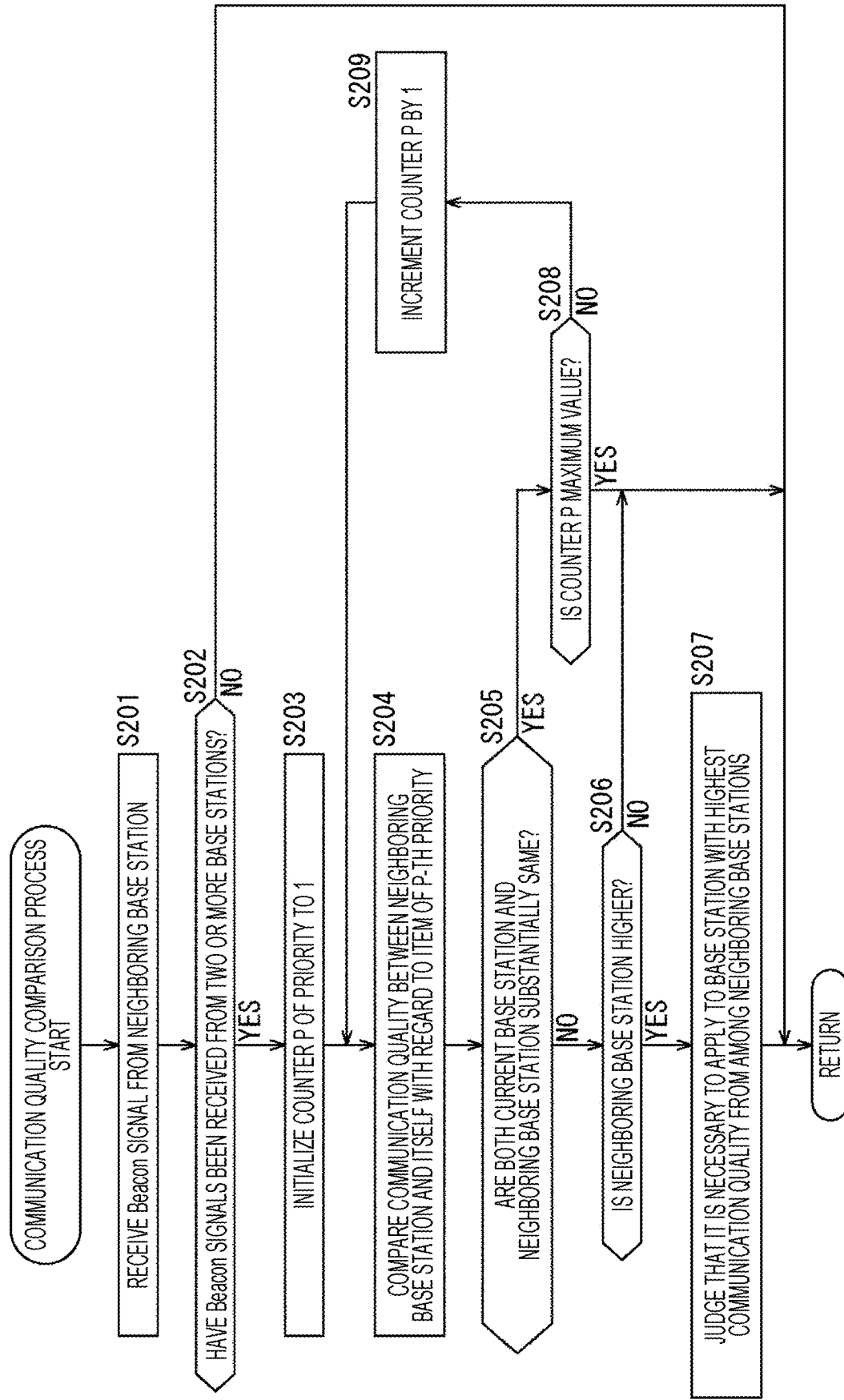
FIG. 18 is a flowchart illustrating a communication quality comparison process by the communication device in FIG. 3.

Here, the communication quality comparison process will be described with reference to the flowchart of FIG. 18.

In step S201, the control unit 71 of the communication device 13 controls the data processing unit 72 so that the wireless communication unit 73 receives the Beacon signals transmitted from the neighboring base stations 12.

In step S202, the control unit 71 controls the data processing unit 72 to determine whether or not the Beacon signals have been received from two or more base stations 12. That is, unless the Beacon signals are received from at least another one or more base stations 12 including the base station 12-1, with which the communication is currently established, no comparison can be performed. Therefore, whether or not the comparison is possible is determined.

In a case where it is considered in step S202 that the Beacon signal has not been received from two or more base stations 12, the process ends. The state in which the communication connection with the current base station 12 has been established continues.

On the other hand, in a case where it is considered in step S202 that the Beacon signals has been received from two or more base stations 12, the process proceeds to step S203.

In step S203, the control unit 71 controls the data processing unit 72 to initialize a counter P of priority to 1.

In step S204, the control unit 71 controls the data processing unit 72 to compare the communication quality between the neighboring base station 12 and the base station 12 with which the communication connection is currently established, with regard to the judgment criterion of a P-th priority.

In step S205, the control unit 71 controls the data processing unit 72 to determine whether or not the communication quality of the base station 12 with which the communication connection is currently established and the communication quality of the neighboring base station 12 are substantially the same with regard to the judgment criteria of the P-th priority.

In step S205, in a case where it is determined that the communication quality of the base station 12 with which the communication connection is currently established and the communication quality of the neighboring base stations 12 are not substantially the same with regard to the judgment criterion of the P-th priority, the process proceeds to step S206.

In step S206, the control unit 71 controls the data processing unit 72 to determine whether or not the communication quality of any of the neighboring base stations 12-1 is higher than the communication quality of the base station 12 with which the communication is currently established, with regard to the judgment criterion of the P-th priority.

In step S206, in a case where it is determined that the communication quality of any of the neighboring base stations 12 is higher than the communication quality of the base station 12 with which the communication connection is currently established, with regard to the judgment criterion of the P-th priority, the process proceeds to step S207.

In step S207, the control unit 71 judges that it is necessary to make a transition to establish the communication with the base station 12 having a higher communication quality, from among the neighboring base stations 12, than the communication quality of the base station 12, with which the communication connection is currently established, with regard to the judgment criterion of the P-th priority, and the process ends.

Further, in a case where it is determined in step S206 that the communication quality of any of the neighboring base stations 12, from among the neighboring base stations 12, is not higher than the communication quality of the base station 12 with which the communication connection is currently established, with regard to the judgment criterion of the P-th priority P, the process of step S207 is skipped, and the process ends.

On the other hand, in a case where it is determined in step S205 that the communication quality of the base station 12 with which the communication is currently established and the communication quality of the neighboring base station 12 are substantially the same with regard to the judgment criterion of the P-th priority, the process proceeds to step S208.

In step S208, the control unit 71 determines whether or not the counter P is the maximum value, that is, the priority P has the lowest value, and determines whether or not the counter P is not the maximum value, that is, does not have the lowest value.

In a case where the counter P is not the maximum value in step S208, the process proceeds to step S209.

In step S209, the control unit 71 controls the data processing unit 72 to increment the counter P by 1, and the process returns to step S204.

That is, with regard to the judgment criterion to become the P-th priority, the comparison between the communication qualities is repeated while gradually lowering the priority of the judgment criteria, until it is determined that the communication quality of the base station 12 with which the communication connection is currently established and the communication quality of the neighboring base station 12 are not substantially the same, or until the priority of the judgment criteria becomes the lowest.

Then, in step S208, in a case where the communication qualities are compared until the counter P becomes the maximum value and the priority of the judgment criterion becomes the lowest, and both are substantially the same, the process ends.

That is, the communication quality is compared from the one with a higher priority as a judgment criterion. In a case where any of the base stations 12 is superior, and such a base station 12 is the base station 12 with which the communication connection is not currently established, it is determined that a communication connection should be applied for. In other cases, it is determined that the communication with the base station 12 with which the communication connection is currently established should be continued.

Figure 12:
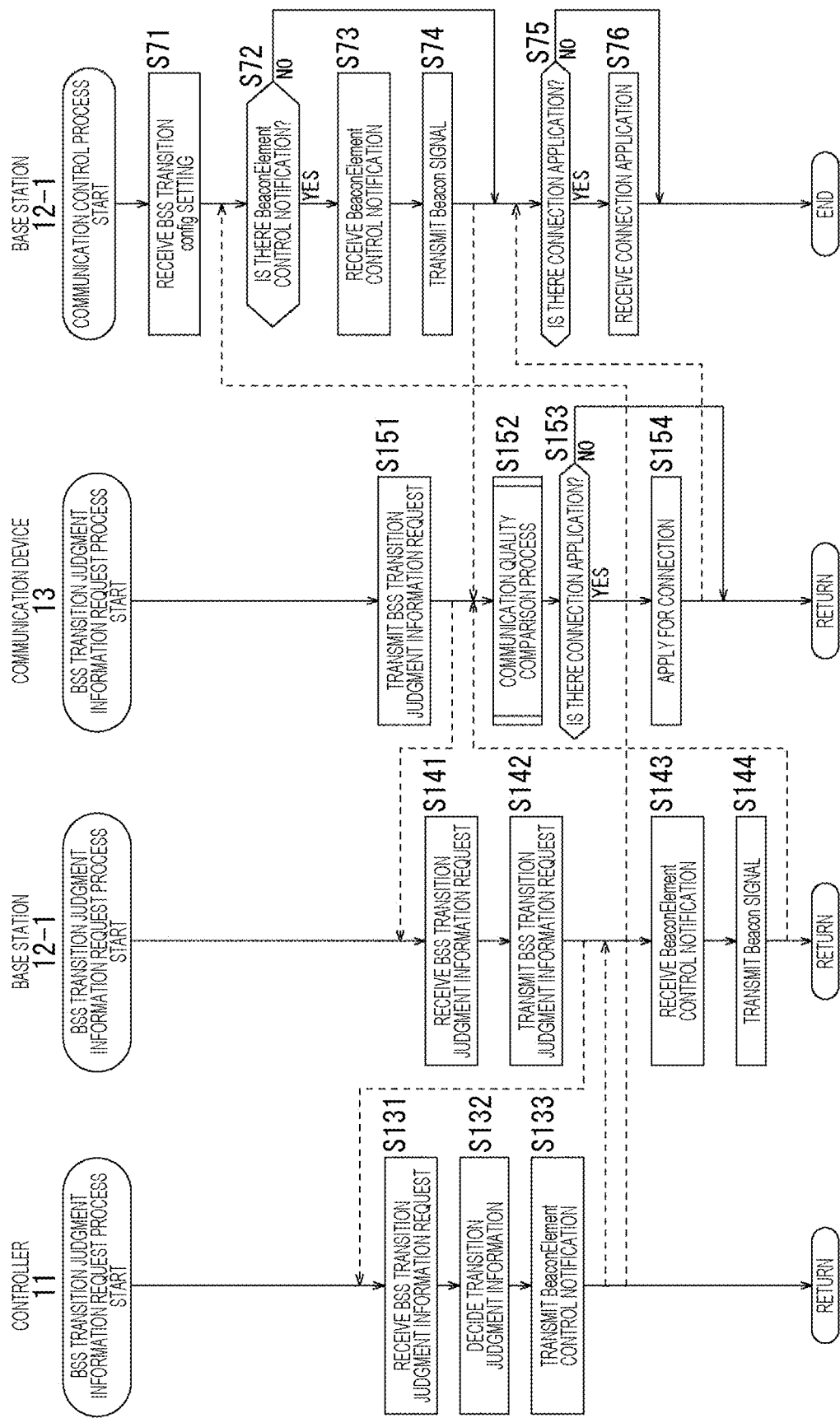
FIG. 12 is a flowchart illustrating a BSS transition judgment information request process by the communication system of FIG. 3.

Here, the description returns to the flowchart of FIG. 12.

In step S153, the control unit 71 of the communication device 13 controls the data processing unit 72 to determine whether or not it is necessary to make a transition of the base station 12 and newly apply for a communication connection. That is, in the present case, in the communication quality comparison process, with regard to the judgment criterion with a high priority, it is determined whether or not the communication quality of the base station 12-2 is higher than that of the base station 12-1 with which the communication connection is currently established, and it is determined whether or not the transition and the communication connection should be applied for.

Then, in step S153, in a case where it is determined that it is necessary to make a transition of the base station 12 and to newly apply for a communication connection, the process proceeds to step S154.

In step S154, the control unit 71 of the communication device 13 controls the data processing unit 72 so that the wireless communication unit 73 transmits a communication connection application to the base station 12-2, which is considered to be higher in the communication quality than the current base station 12 in the communication quality comparison process, and which becomes a transition destination.

In step S75, the control unit 51 of the base station 12-2 controls the data processing unit 52 to determine whether or not the communication connection application that had been transmitted from the communication device 13 has been received by the wireless communication unit 53. In a case where the communication connection application is received, the process proceeds to step S76.

In step S76, the control unit 51 of the base station 12-2 controls the data processing unit 52 to receive the communication connection application on the basis of the communication connection application that has been received by the wireless communication unit 53, and stablishes a communication connection with the communication device 13.

Further, in step S153, in a case where it is not determined that it is necessary to make a transition of the base station 12 or newly apply for the communication connection, the process of step S154 is skipped.

Correspondingly, in step S75, since it is considered that there is no connection application, the process of step S76 is skipped.

By the above process, when the communication quality is lower than the second threshold value, the communication device 13 requests the neighboring base stations 12 to respectively transmit information to become the judgment criteria placed in the Beacon signals. Upon reception of the Beacon signals, the judgment criteria are sequentially compared in a descending order of priority. In a case where the neighboring base station 12 is considered to be superior, a transition to a new base station 12-2 with a higher communication quality is achieved.

Accordingly, without issuing a query about the optimum transition destination to the controller 11 or the base station 12, the communication device 13 obtains information necessary for the BSS transition judgment from the Beacon signals from the neighboring base stations 12, and is capable of deciding the optimum transition destination by itself. The achievements of advancements and shortening of the BSS transition are enabled.

As a result, the base station 12 with which the communication connection should be established is selected on the basis of the judgment criterion with a high priority. Therefore, the achievement in the stable communication is enabled in response to a change in the wireless LAN communication environment.

It is to be noted that in the above description, the description has been given with regard to the method for controlling, by the controller 11 or the base station 12, the information included in the Beacon signal, when the communication device 13 in the communication system 1 in FIG. 3 makes a BSS transition from the base station 12-1, with which the communication connection has been established, to the base station 12-2 with a higher communication quality. However, also in other processes, the information included in the Beacon signal may be controlled.

For example, when the base station 12 switches a channel, the base station 12 transmits a Beacon signal for controlling Channel Switch Announcement to be included in the Beacon signal, so that the communication device 13 is capable of learning beforehand that a channel is to be switched. Therefore, the communication device 13 is capable of switching the channel in synchronization with a timing when the base station 12 switches the channel on the basis of Channel Switch Announcement, so as to enable the continuation of communication even when the channel is switched.

Further, even in a case where a newly connected communication device 13 necessitates information that is not included in the Beacon signal due to the implementation dependence of the base station 12, Criteria ID used for designating the information to be placed in the Beacon signal for transmission is enabled, in a similar manner to the case of transmitting the BSS transition judgment information request.

3. First Application Example of First Embodiment

In the above description, an example in which the communication device 13 performs the communication quality determination process when receiving the DL signal from the base station 12-1 has been described. However, the base station 12-1 may perform a signal quality determination process on the basis of an upload (UL) signal from the communication device 13, and may transmit a BSS transition query or a BSS transition judgment information request.

Such a configuration eliminates the need for transmitting the determination result by the signal quality determination process from the communication device 13. Therefore, a reduction in the amount of communication data of the entire communication system 1 is enabled.

<Communication Control Process in a Case where Base Station Performs Signal Quality Determination Process>

Next, a communication control process of a case where the signal quality determination process is performed by the base station 12-1 will be described with reference to the flowchart of FIG. 19.

Figure 19:
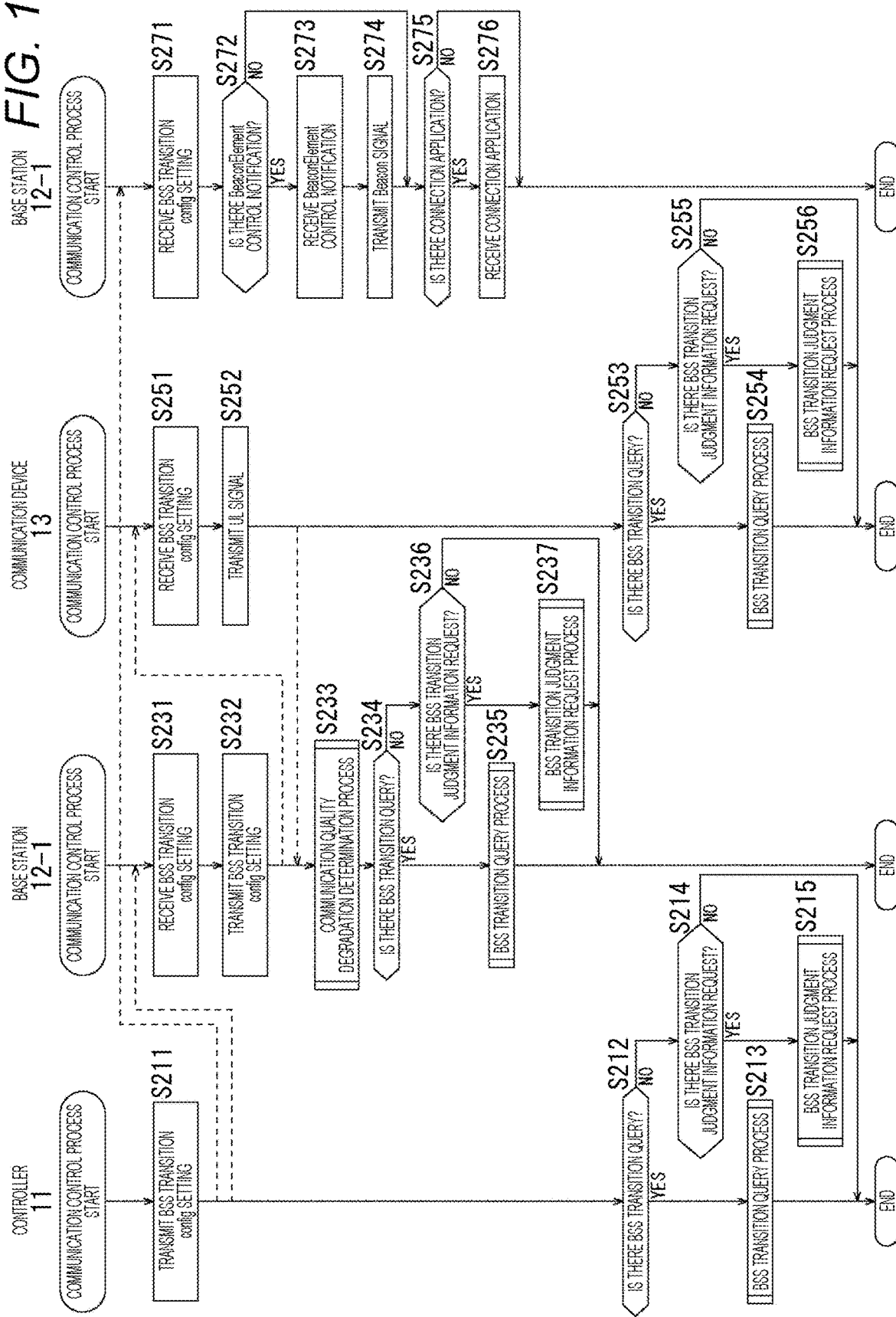
FIG. 19 is a flowchart illustrating a communication control process in a case where a signal quality determination process is performed by the base station by the communication device in FIG. 3.

It is to be noted that a process of steps S211 to S215, a process of steps S231 to S232, and S234 to S237, a process of steps S251, and S253 to S256, and a process of steps S271 to S276 in the flowchart of FIG. 19 are similar to the process of steps S11 to S15, the process of steps S31 to S32, and S34 to S37, the process of steps S51, and S53 to S56, and the process of steps S71 to S76 in the flowchart of FIG. 7, and the description thereof will be omitted.

That is, in the flowchart of FIG. 19, the difference from the flowchart of FIG. 7 is the process of steps S233 and S252.

That is, in step S252, the control unit 71 of the communication device 13 controls the data processing unit 72 on the basis of the BSS transition config setting, and transmits the UL signal from the wireless communication unit 73 to the base station 12-1.

In response to this, in step S233, the control unit 51 of the base station 12-1 receives the UL signal that has been transmitted from the communication device 13 on the basis of the BSS transition config setting, performs the communication quality degradation determination process, and determines a degradation of the communication quality.

For the subsequent processes, any of the BSS transition query process, the BSS transition judgment information request process, and none of the process is performed, on the basis of the determination result of the communication quality degradation determination process.

In the communication control process of FIG. 19, the communication quality degradation determination process is performed by the base station 12-1. This eliminates the need for a process of transmitting the determination result of the communication quality degradation determination process from the communication device 13 to the base station 12-1. A reduction in the amount of the communication data in the entire communication system 1 is enabled.

4. Second Application Example of First Embodiment

In the above description, Mandatory Element ID in Required Beacon Element ID included in the Beacon Element control notification has been decided on the basis of the BSS Transition Criteria included in the BSS transition judgment information request transmitted from the communication device 13, but may be set beforehand according to a service content in the communication device 13.

That is, for example, as shown in FIG. 20, the priority (Priority) and the judgment criterion (Criteria) are set according to the service content. The communication device 13 may transmit information regarding the content of the service, instead of the BSS Transition Criteria, when transmitting the BSS transition judgment information request.

In FIG. 20, the priority (Priority) is set to 0, 1, 2 . . . from the top, as indicated in the leftmost part in the figure, and File DownLoad, Video Call, and Real-Time Gaming are shown as the service contents.

In FIG. 20, the priority becomes 0, and the RSSI (the received electric power) is set as a judgment criterion (Criteria) for the lowest File DownLoad. It is indicated that no setting is made as Required Beacon Element ID, which is an identifier in the corresponding Beacon signal. That is, the RSSI is measured by default.

In addition, regarding Video Call with a priority of 1, the RSSI (the received electric power) and a BSS Load (BSS load) are set as judgment criteria (Criteria), and it is indicated that 28 corresponding to the BSS Load (BSS Load) is set as the Required Beacon Element ID, which is an identifier in the Beacon signal.

Furthermore, regarding Real-Time Gaming with a priority of 2, Accesses Delay (an access delay), RSSI (the received electric power), and BSS Load (BSS load) are set as judgment criteria (Criteria). It is indicated that 28 corresponding to the BSS Load and 39 corresponding to the BSS Average Access Delay are respectively set as the Required Beacon Element IDs, which are the identifiers in the Beacon signal.

The network control unit 35 of the controller 11 stores a table as shown in FIG. 20, reads a Required Beacon Element ID in the table of FIG. 20 according to the information of the service content included in the BSS transition judgment information request from the communication device 13, generates a Beacon Element control notification frame, and transmits the Beacon Element control notification frame to all the base stations 12.

Further, only the Required Beacon Element ID corresponding to a service may be set beforehand, and the priority of each service may be included in the BSS transition judgment information request from the communication device 13. In this case, information regarding the priority may be judged from information such as a priority code point (PCP) and, an access category (AC), or the like.

Further, regarding the table showing the correspondence between the service content and the Required Beacon Element ID as shown in FIG. 20, for example, by the process of step S76 in the flowchart of FIG. 7, as a part of the procedure when the communication connection is newly established between the base station 12 and the communication device 13, the table may be supplied to the controller 11 via the base station 12 with which the communication connection has been newly established from the communication device 13, so as to be the information that has been designated by the communication device 13.

It is to be noted that regarding the process, in step S132 of FIG. 12, the difference is only the process of deciding the content of the BSS transition judgment information with reference to FIG. 20. Therefore, the description thereof will be omitted.

5. Third Application Example of First Embodiment

In the above description, an example in which the transition of the base station 12 is judged on the basis of the determination result of the communication quality degradation determination process regardless of the user's intention has been described. However, the determination result of the communication quality degradation determination process may be presented to the user, and the transition of the base station 12 may be made by a user's judgment.

Figure 21:
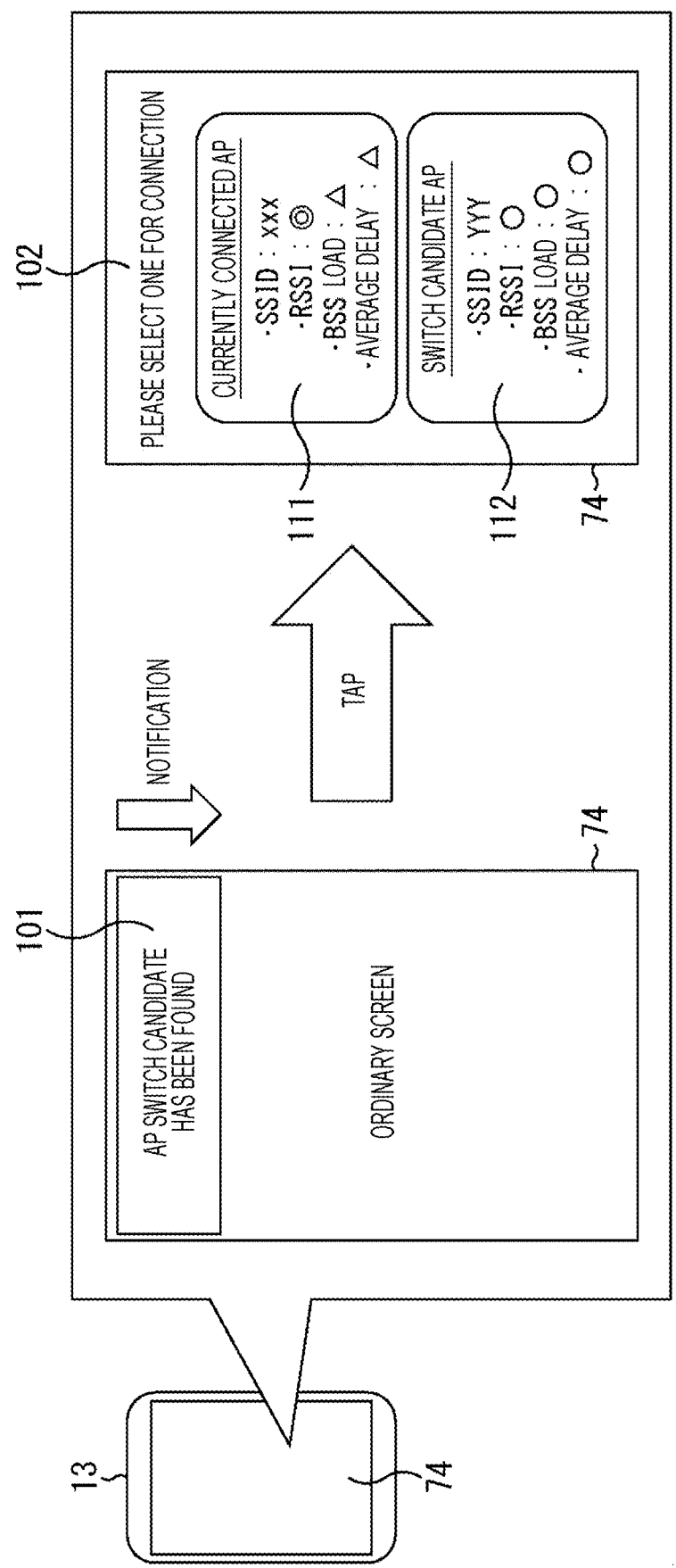
FIG. 21 is a diagram illustrating a display example of a process result of a signal quality determination process performed by the communication device in FIG. 3.

That is, for example, in a case where the communication quality of a neighboring base station 12 is higher by the comparison result in the communication quality comparison process, and can be considered to be a candidate for the transition destination, the control unit 71 controls the display unit 74 to display, for example, a pop-up 101 representing that "AP switch candidate has been found" on a normal screen, as indicated in the left part of FIG. 21. The user is able to recognize that the back of the transition destination has been found by the pop-up 101 being displayed.

The pop-up 101 is operated by the user for confirming the information regarding the base station 12 to become a candidate for the transition destination and considering the transition of the base station 12, that is, the BSS transition, and by being tapped, for example, the display of the display unit 74 is switched so that, for example, a comparison result 102 as indicated in the right part of FIG. 21 is displayed.

In the comparison result 102 on the right side of FIG. 21, "Please select one for connection" is represented at the top, and below the top, a display field 111 is displayed for presenting a comparison result for every judgment criterion in the base station 12 currently being connected with. Further, below the display field 111, a display field 112 for presenting a comparison result for every judgment criterion in the base station 12, which becomes a candidate for the transition destination, that is, a candidate for a switch destination.

In FIG. 21, in the display field 111, "currently connected AP" is represented at the uppermost level, indicating that the information regarding the base station 12 with which the connection is currently established is displayed. Then, in the display field 111, from the top, the SSID of the base station 12 with which the connection is currently established is XXX. The RSSI is represented by a double circle, and is in a good condition. The BSS load is represented by a triangle mark, and is in a slightly bad state. The average delay is represented by a triangle mark to indicate that it is in a slightly bad state.

On the other hand, in the display field 112, from the top, "switch candidate AP" is represented, and the information regarding the base station 12 to become a candidate for the transition destination is displayed. Then, in the display field 112, from the top, the SSID of the base station 12 to become a switch candidate is YYY. The RSSI is represented by a circle, and is in an ordinary state. The BSS load is represented by a triangle mark, and is in a slightly bad state. The average delay is represented by a triangle mark, and is in a slightly bad state.

It is to be noted that in a case where the comparison result 102 of FIG. 21 is displayed, it is assumed as a precondition that the BSS load and the average delay are higher in the priority order than the RSSI, in the judgment criteria. That is, in the comparison result 102 of FIG. 21, as indicated by the display fields 111 and 112, regarding the BSS load and the average delay, the base station 12 of a transition destination to become a switch candidate is better in the communication quality than the base station 12 with which the connection is currently established. As a result, it is considered that the switch candidate has been found.

The user is able to judge which base station 12 the connection is to be established with, on the basis of the information regarding the judgment criteria in the display fields 111 and 112, and to select a connection destination by tapping either the display field 111 or 112.

That is, in the case of FIG. 21, when the display field 111 is tapped, the connection with the base station 12 currently connected with is continued. When the display field 112 is tapped, the connection with the base station 12 to become a candidate for the transition destination is applied for and the connection is switched.

<Communication Quality Comparison Process in Third Application Example of First Embodiment>

Figure 22:
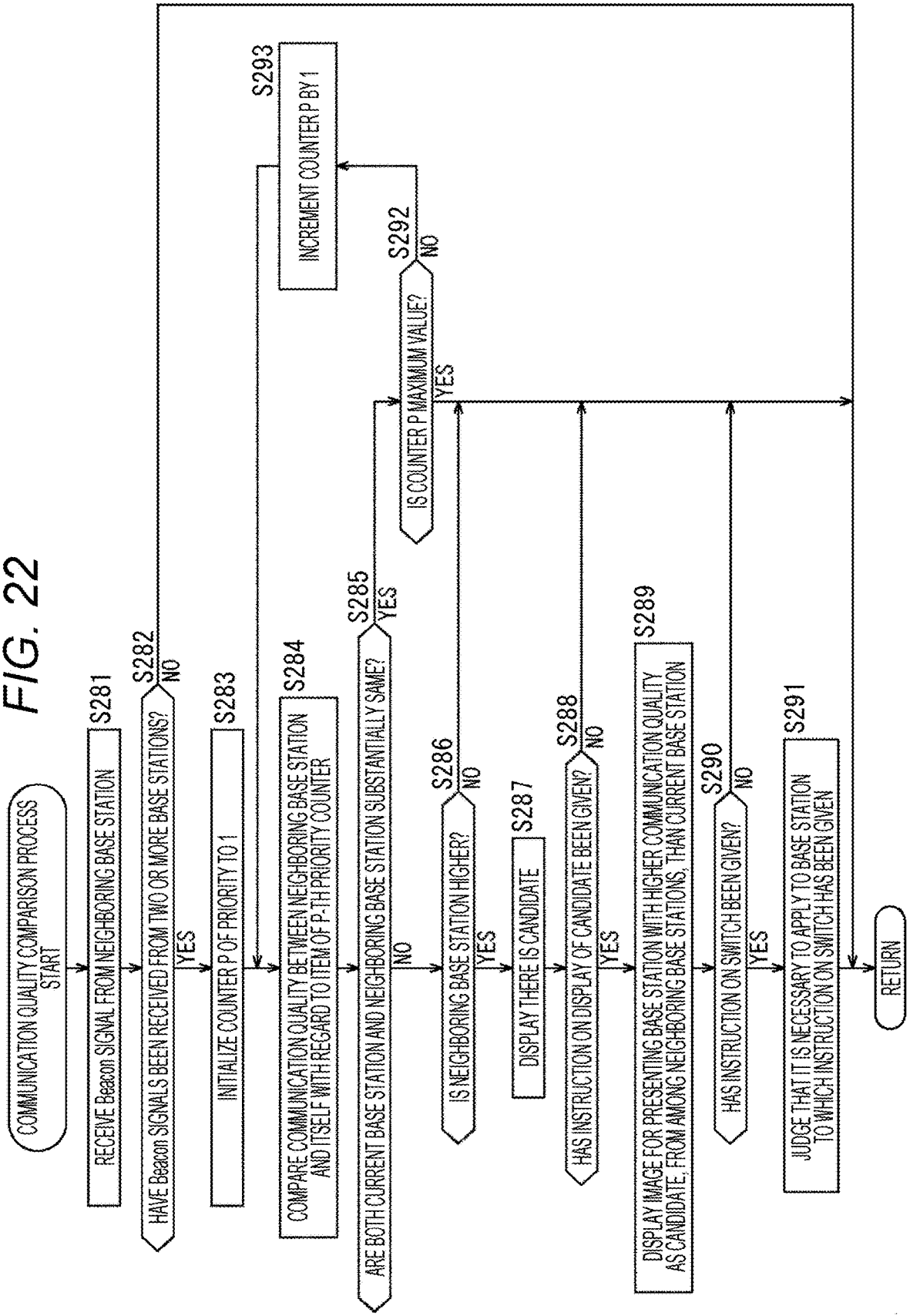
FIG. 22 is a flowchart illustrating the communication quality comparison process in a case where a process result of the signal quality determination process is displayed.

Next, a communication quality comparison process in a third application example of the first embodiment will be described with reference to the flowchart of FIG. 22. It is to be noted that the process of steps S281 to S286 and S291 to S293 in the flowchart of FIG. 22 is similar to the process of steps S201 to S209 in the flowchart of FIG. 18. Therefore, the description thereof will be omitted as appropriate.

That is, in step S286, in a case where it is determined that the communication quality of any of the neighboring base stations 12 is higher than the communication quality of the base station 12 with which the communication is currently established, with regard to the judgment criterion of the P-th priority, the process proceeds to step S287.

In step S287, the control unit 71 displays, on an ordinary screen displayed by the display unit 74, a pop-up 101 shown in, for example, FIG. 21, indicating that there is a base station 12 to become a switch candidate with a higher communication quality, from among the neighboring base stations 12, than the communication quality of the base station 12 with which communication is currently established, with regard to the judgment criterion of the P-th priority.

In step S288, the control unit 71 determines whether or not the display unit 74 is operated as a touch panel and the pop-up 101 is tapped. In a case of being tapped, the process proceeds to step S289.

In step S289, the control unit 71 generates the display fields 111 and 112 respectively including the information regarding the communication qualities of the base station 12 with a higher priority, from among the neighboring base stations 12, than the communication quality of the base station 12 with which the communication is currently established, and the base station 12 with which the connection is currently established, with regard to the judgment criterion of the P-th priority, and controls the display unit 74 to display as the comparison result 102.

In step S290, the control unit 71 determines whether or not the display unit 74 is operated as a touch panel and the display field 112 is tapped to give an instruction for switching. In a case where the instruction is given for switching, the process proceeds to step S291.

In step S291, the control unit 71 judges that it is necessary to make a transition to the base station 12 with a higher communication quality, from among the neighboring base stations 12, than the communication quality of the base station 12 with which the communication connection is currently established, and to establish the communication, with regard to the judgment criterion of the P-th priority.

It is to be noted that in a case where the pop-up 101 is not tapped in step S288, or in a case where the display field 111 is tapped and an instruction on the transition of the base station 12 is not given in step S290, the process ends and the switching of the base station 12 is not conducted.

By the above process, the determination result of the communication quality degradation determination process is presented to the user, and the transition of the base station 12 according to a user's judgment is enabled.

Accordingly, for example, in a case where a base station 12 to become a switch candidate is found by moving from a predetermined location to another one, but the base station 12 returns to the original predetermined location within a short period of time, a user tries not to select the transition of the base station 12 so that an occurrence of a delay associated with the transition of the base station 12 can be avoided.

6. Second Embodiment

In the above description, the case where the communication system 1 including the controller 11, the base stations 12-1 and 12-2, and the communication device 13 has been described. However, the communication system 1 may have a configuration including base stations 12-1 and 12-2 and the communication device 13.

Figure 23:
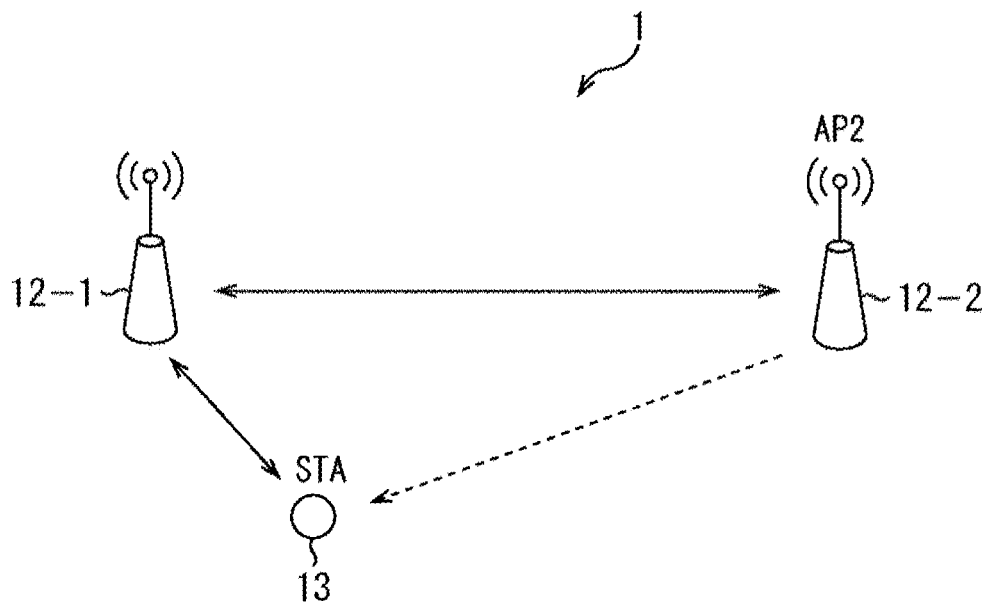
FIG. 23 is a diagram illustrating a communication system in a second embodiment of the present disclosure.

That is, as shown in FIG. 23, the communication system 1 may have a configuration including the base stations 12-1 and 12-2 and the communication device 13.

It is to be noted that also in the communication system 1 of FIG. 23, the description will be given as a precondition that the communication device 13 has established the connection for communication via the base station 12-1.

That is, in such a case, the base station 12-1 with which the communication with the communication device 13 has been established also functions as the controller 11 and the base station 12-1 in FIG. 1.

That is, the communication device 13 performs the communication quality degradation determination process, and transmits a determination result to the base station 12-1. In response to this, the base station 12-1 performs either the BSS transition query process or the BSS transition judgment information request process by the controller 11 and the base station 12-1 in FIG. 1, on the basis of a determination result of the communication quality degradation determination process.

<Communication Control Process in Communication System Including Base Station and Communication Device>

Next, a communication control process in the communication system including the base stations 12-1 and 12-2 and the communication device 13 will be described with reference to the flowchart of FIG. 24.

Figure 24:
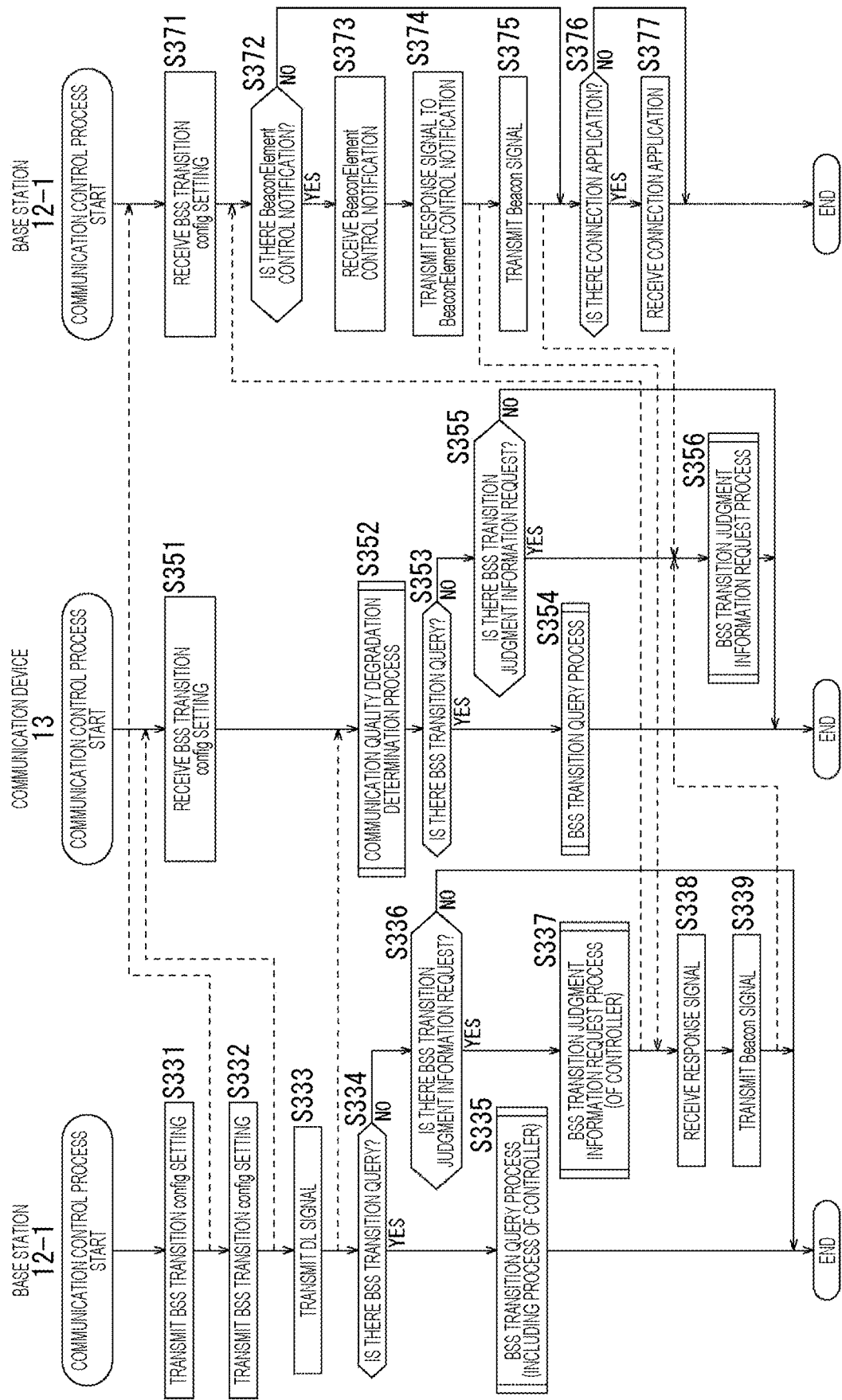
FIG. 24 is a flowchart illustrating a communication control process by the communication system of FIG. 23.

It is to be noted that, regarding a process of steps S331 to S334 and S336, and a process of steps S351 to S356, S371 to S373, and S375 to S377 in the flowchart of FIG. 24 are similar to the process of steps S11, S32 to S34, and S36, and the process of steps S51 to S56, and the process of steps S71 to S76 in FIG. 7. Therefore, the description thereof will be omitted.

Figure 11:
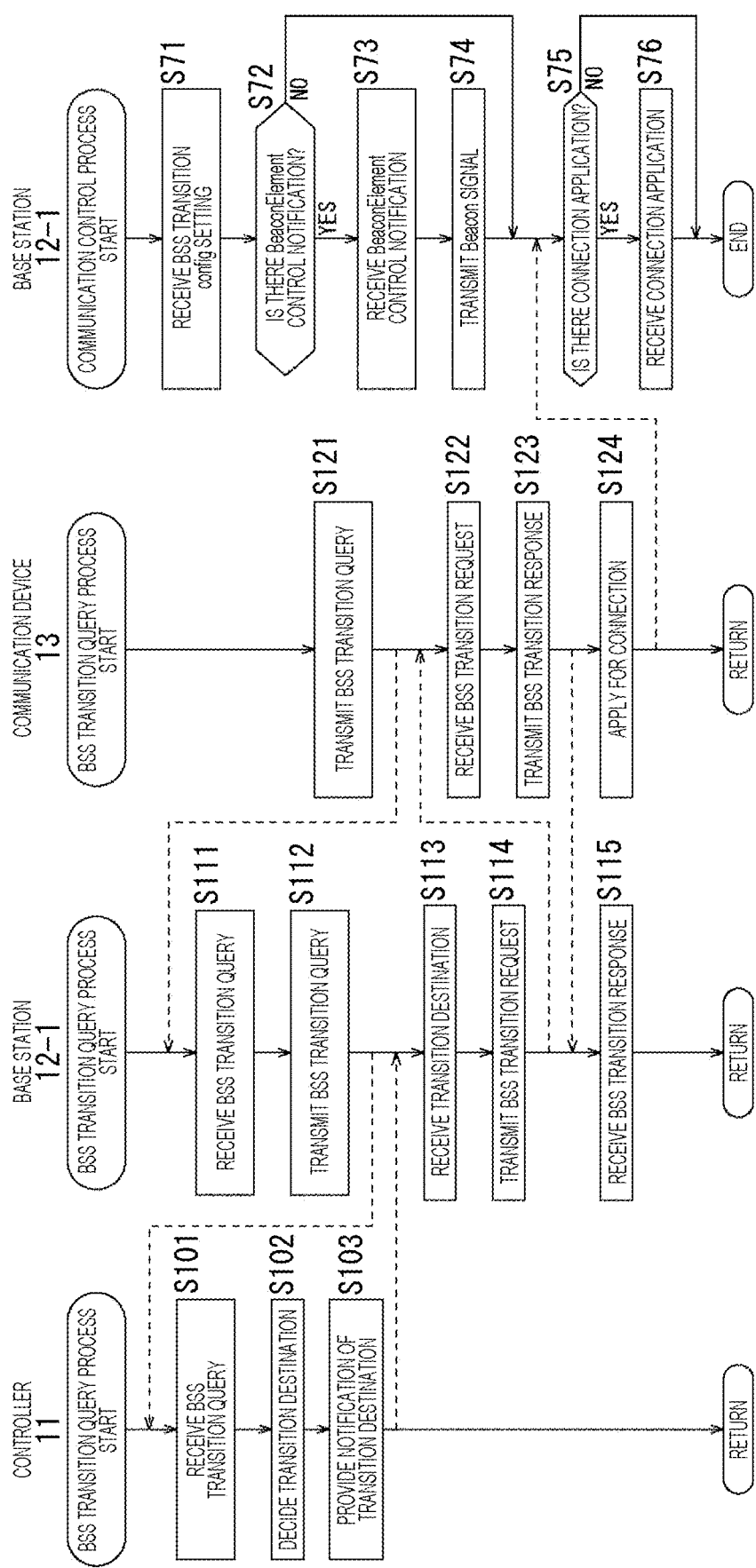
FIG. 11 is a flowchart illustrating a BSS transition query process by the communication system of FIG. 3.

That is, in the process of step S335, the base station 12-1 performs the process of steps S111, S102, and S114 in FIG. 11, receives the BSS transition query, decides the transition destination, generates the BSS transition request, and transmits the BSS transition request to the communication device 13.

Further, in the process of step S337, the base station 12-1 performs the process of steps S141, S132, S133 (only the Beacon Element control notification is generated) and S144 in FIG. 12, receives the BSS transition judgment information request, determines the BSS transition judgment information, generates the Beacon Element control notification, and transmits the Beacon Element control notification to all the base stations 12.

In this situation, upon reception of the Beacon Element control notification, in the base station 12-2, in step S374, the control unit 51 of the base station 12-2 controls the data processing unit 52 to generate a response signal to the Beacon Element control notification, and causes the wireless communication unit 53 to transmit the response signal to the base station 12-1, from which the Beacon Element control notification has been transmitted.

In response to this, in step S338, the control unit 51 of the base station 12-2 controls the data processing unit 52 so that the wireless communication unit 53 receives the response signal to the Beacon Element control notification.

Then, in step S339, the control unit 51 of the base station 12-2 controls the data processing unit 52 to generate a Beacon in response to the Beacon Element control notification, and causes the wireless communication unit 53 to transmit the Beacon to the communication device 13.

<Beacon Element Control Notification Frame in Communication System Shown in FIG. 23>

A Beacon Element control notification frame to be transmitted from the base station 12-1 to the base station 12-2 in the communication system of FIG. 23 has, for example, a configuration example as shown in FIG. 25.

In the Beacon Element control notification frame in FIG. 25, from the left in the upper level in the figure, Element ID of one Octet, Length of one Octet, Element ID Extention of one Octet, and Required Beacon Element ID of N Octets are stored.

Element ID is information of an identifier of the Beacon Element control notification, and Length is information regarding a data length.

In addition, Element ID Extention is an extension of the identifier of the Beacon Element control notification, and stores information indicating whether or not Steering Info is stored.

It is to be noted that Required Beacon Element ID is similar to the Beacon Element control notification frame that has been described with reference to FIG. 16. Therefore, the description thereof will be omitted.

That is, the Beacon Element control notification frame shown in FIG. 25 has a tlv format.

Also in the above configuration, in a similar manner to the communication system 1 in FIG. 3, the achievement of the stable communication in response to a change in the communication environment of a wireless local area network (LAN) is enabled.

7. Example Performed by Software

The above-described series of processes, by the way, can be performed by hardware, but can also be performed by software. In a case where the series of processes is performed by software, a program that constitutes the software is installed from a recording medium into a computer embedded in dedicated hardware or into, for example, a general-purpose computer capable of conducting various functions by installing various programs.

Figure 26:
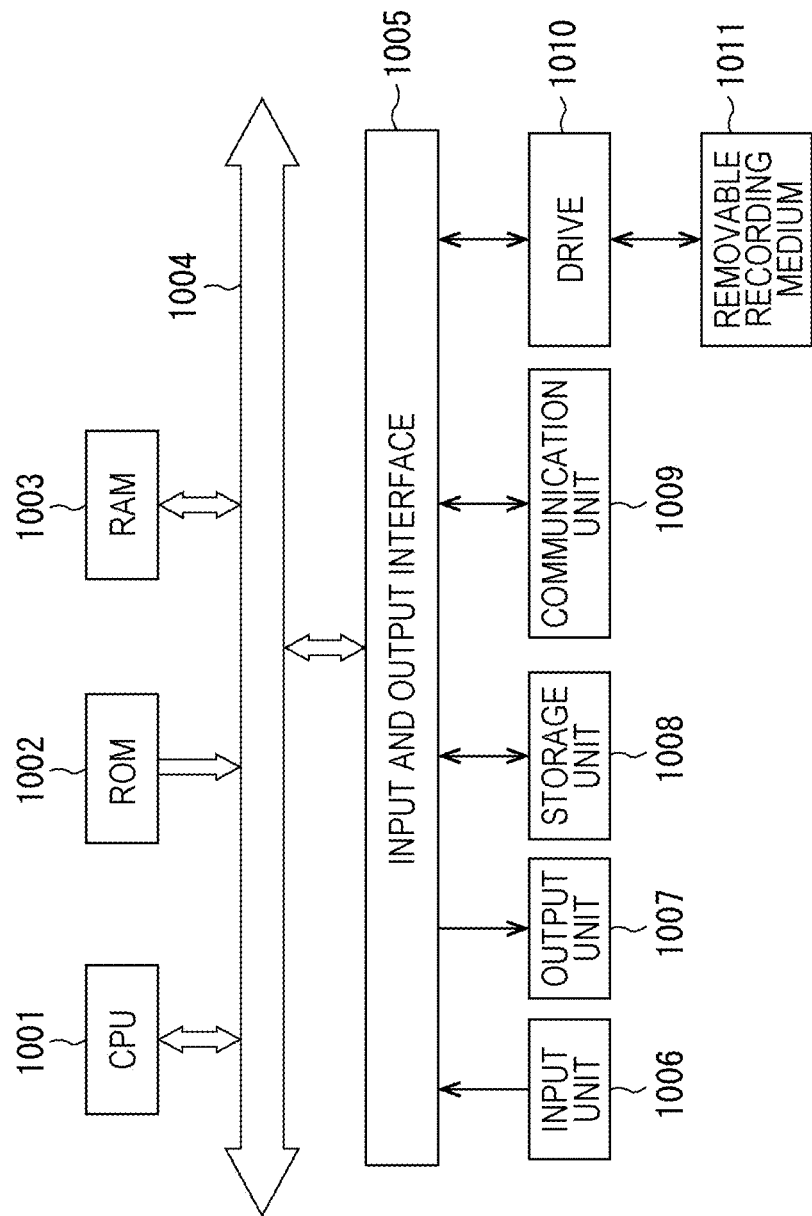
FIG. 26 is a diagram illustrating a configuration example of a general-purpose personal computer.

FIG. 26 shows a configuration example of the general-purpose computer. Such a personal computer includes a built-in central processing unit (CPU) 1001. An input and output interface 1005 is connected with the CPU 1001 via a bus 1004. A read only memory (ROM) 1002 and a random access memory (RAM) 1003 are connected with the bus 1004.

The input and output interface 1005 includes an input unit 1006 including input devices such as a keyboard and a mouse for a user to input operation commands, an output unit 1007 for outputting a process operation screen and an image of a process result to a display device, a storage unit 1008 including a hard disk drive for storing programs and various data, a local area network (LAN) adapter, and the like, and is connected with a communication unit 1009 for performing a communication process via a network represented by the Internet. In addition, a drive 1010 is connected for reading and writing data to and from a removable storage medium 1011, such as a magnetic disk (including a flexible disk), an optical disk (including a compact disc-read only memory (CD-ROM), a digital versatile disc (DVD)), a magneto-optical disk (including mini disc (MD)), or a semiconductor memory.

The CPU 1001 performs various processes according to a program stored in the ROM 1002 or a program installed from the removable storage medium 1011 such as the magnetic disk, the optical disk, the magneto-optical disk, or the semiconductor memory, into the storage unit 1008, and loaded from the storage unit 1008 onto the RAM 1003. The RAM 1003 also appropriately stores data necessary for the CPU 1001 to perform the various processes.

In the computer configured as described above, the CPU 1001 loads the program stored in the storage unit 1008 onto the RAM 1003 via the input and output interface 1005 and the bus 1004, and performs the above-described series of processes, for example.

The program conducted by the computer (the CPU 1001) can be recorded and supplied on the removable storage medium 1011 as a package medium or the like, for example. In addition, the program can be also supplied via a wired or wireless transmission medium such as a local area network, the Internet, and digital satellite broadcasting.

In the computer, the program can be installed into the storage unit 1008 via the input and output interface 1005 by attaching the removable storage medium 1011 to the drive 1010. Further, the program can be received by the communication unit 1009 and installed in the storage unit 1008 via a wired or wireless transmission medium. In addition, the program can be installed beforehand in the ROM 1002 or the storage unit 1008.

It is to be noted that the program performed by the computer may be a program that is processed in a time-series order according to the order described in the present specification, or may be a program that is processed in parallel or at a necessary timing such as when a call is made, or the like.

Figure 4:
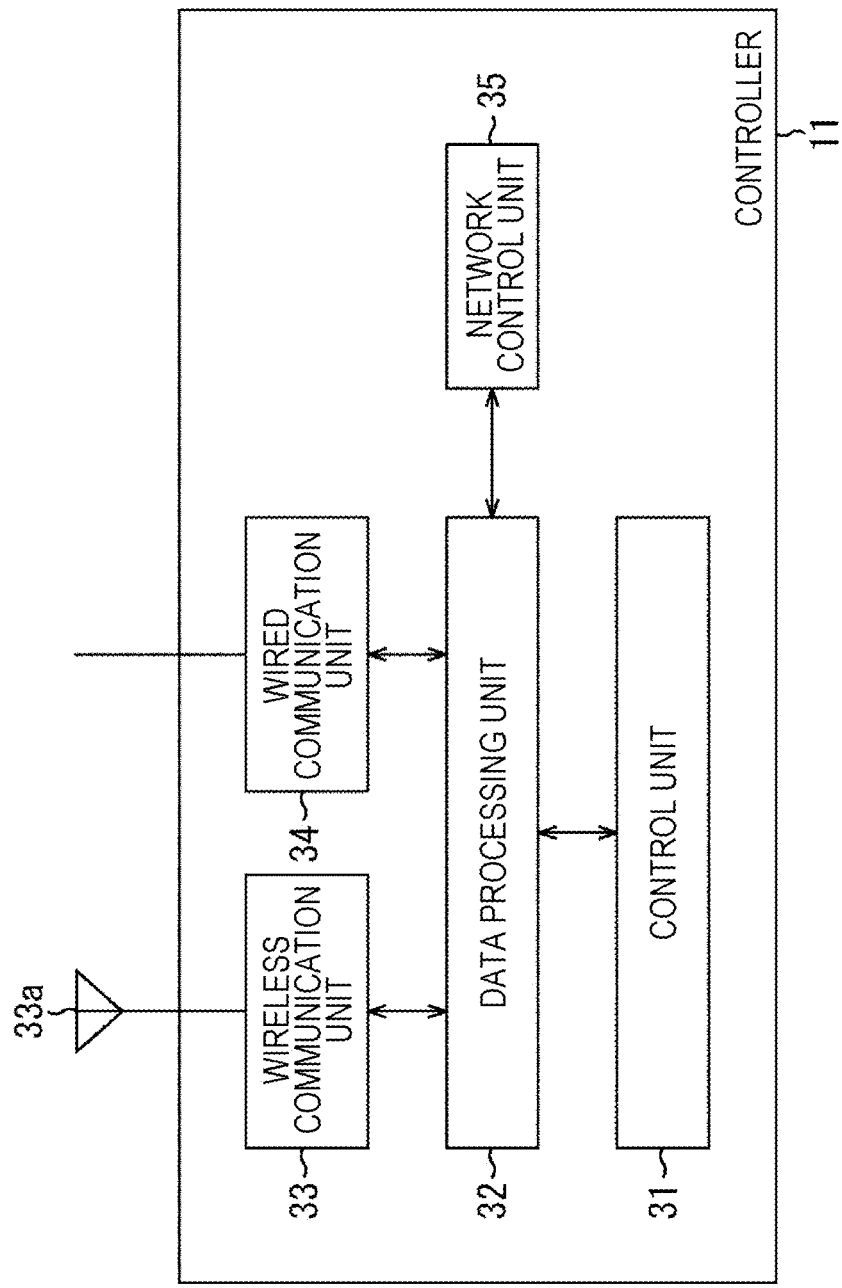
FIG. 4 is a diagram illustrating a configuration example of a controller in the communication system of FIG. 3.
Figure 5:
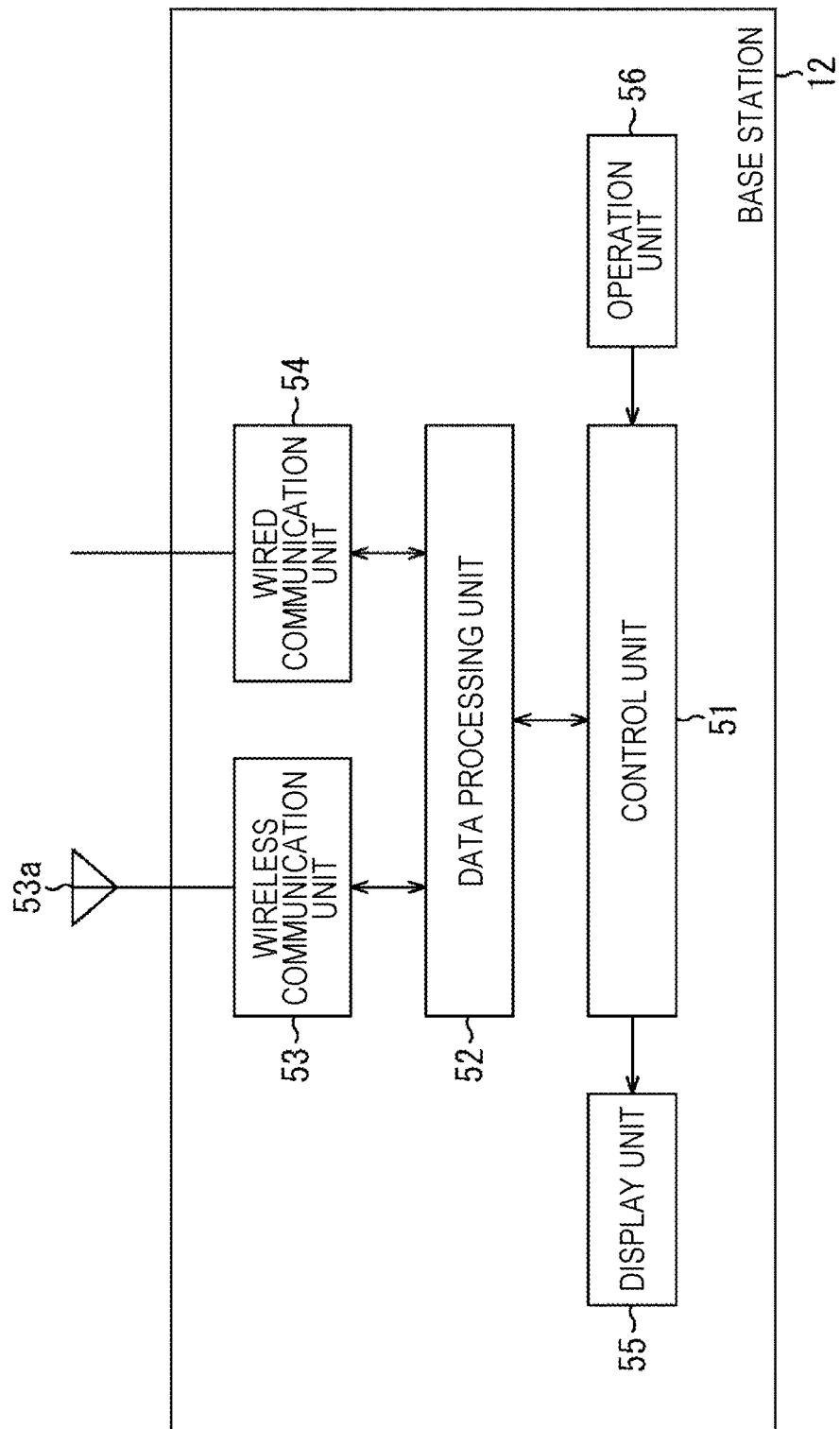
FIG. 5 is a diagram illustrating a configuration example of a base station in the communication system of FIG. 3.
Figure 6:
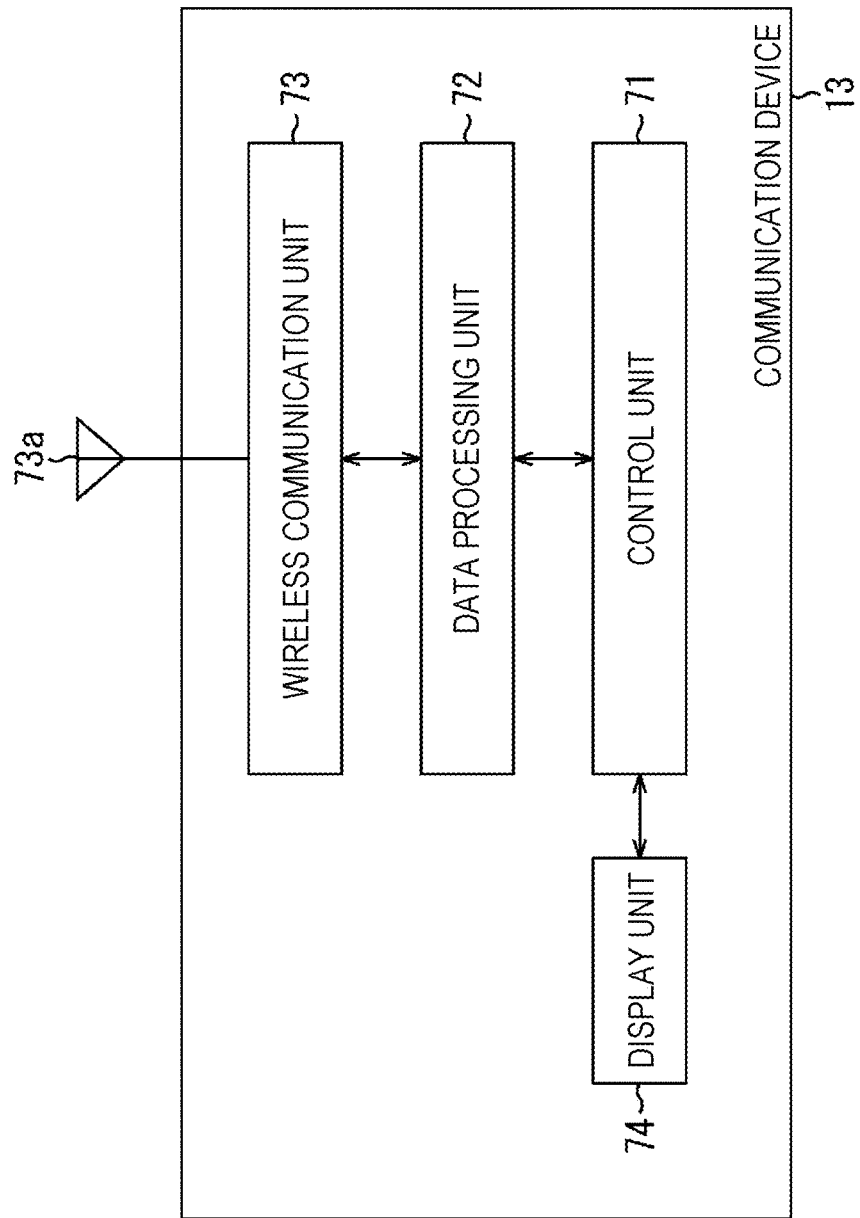
FIG. 6 is a diagram illustrating a configuration example of the controller in the communication device in FIG. 3.

It is to be noted that the CPU 1001 in FIG. 26 achieves the functions of the control unit 31 in FIG. 4, the control unit 51 in FIG. 5, and the control unit 71 in FIG. 6.

Further, in the present specification, the system means a group of a plurality of component elements (devices, modules (parts), and the like), and does not matter whether or not all the component elements are included in the same housing. Therefore, a plurality of devices accommodated in separate housings and connected via networks, and a single device in which a plurality of modules is accommodated in a single housing are both systems.

It is to be noted that the embodiments of the present disclosure are not limited to the above-described embodiments, and various changes can be made without departing from the gist of the present disclosure.

For example, the present disclosure can be configured as cloud computing in which a single function is shared by a plurality of devices via networks, and is processed in cooperation.

Further, each step that has been described in the above-described flowcharts can be performed by a single device, or can be shared and performed by a plurality of devices.

Further, in a case where a single step includes a plurality of processes, the plurality of processes included in such a single step can be performed by a single device or shared by a plurality of devices.

It is to be noted that the present disclosure can also have the following configuration.

<1> A wireless device including:
a control unit configured to control inclusion information included in a Beacon signal in a wireless base station that is to establish a communication connection for communication with a wireless terminal.

<2> The wireless device described in <1>,
in which in a case where the wireless terminal selects a wireless base station with which the wireless terminal is to establish the communication connection for the communication on the basis of a communication quality of the wireless base station, the control unit controls the inclusion information included in the Beacon signal in the wireless base station.

<3> The wireless device described in <2>,
in which the control unit transmits, to the wireless terminal, information for setting to determine whether or not the wireless terminal selects a new wireless base station with which the wireless terminal is to establish the communication connection for the communication on the basis of the communication quality with the wireless base station with which the communication connection is currently established.

<4> The wireless device described in <3>,
in which the control unit transmits, to the wireless terminal, the information for setting to determine whether or not the wireless terminal selects the new wireless base station with which the wireless terminal is to establish the communication connection for the communication on the basis of at least any of a received electric power, a packet success rate, or a standby period of the communication quality with the wireless base station with which the communication connection is currently established.

<5> The wireless device described in <4>,
in which the control unit transmits, to the wireless terminal, the information for setting to determine whether or not the wireless terminal selects the new wireless base station with which the wireless terminal is to establish the communication connection for the communication on the basis of a comparison between a predetermined threshold value and the at least any of the received electric power, the packet success rate, or the standby period of the communication quality with the wireless base station with which the communication connection is currently established.

<6> The wireless device described in <5>,
in which the predetermined threshold value includes a threshold value higher than a level at which the wireless base station is caused to make a transition immediately,
in a case where the at least any of the received electric power, the packet success rate, or the standby period of the communication quality with the wireless base station with which the communication connection is currently established is lower than the predetermined threshold value, the control unit transmits, to the wireless terminal, the information for setting to determine whether or not the wireless terminal selects the new wireless base station with which the wireless terminal is to establish the communication connection for the communication.

<7> The wireless device described in <1>,
in which the control unit controls the inclusion information included in the Beacon signal on the basis of information designated in the wireless terminal.

<8> The wireless device described in <7>,
in which notification of the information designated in the wireless terminal is provided by the wireless terminal.

<9> The wireless device described in <7>,
in which the information designated in the wireless terminal is specified by a service type of the wireless terminal.

<10> The wireless device described in any of <1> to <9>,
in which the control unit transmits, to the wireless base station, a control notification for designating the inclusion information included in the Beacon signal as an Element ID, and
the wireless base station controls the inclusion information included in the Beacon signal on the basis of the Element ID in the control notification, and transmits the Beacon signal.

<11> The wireless device described in <10>,
in which the wireless base station further includes information for specifying a period or a timing at which the inclusion information included in the Beacon signal is included.

<12> A wireless communication method by a wireless device, the wireless communication method including:
a control process for controlling inclusion information included in a Beacon signal in a wireless base station that is to establish a communication connection for communication with a wireless terminal.

<13> A wireless terminal including:
a control unit configured to select a new wireless base station with which the wireless terminal is to establish a communication connection on the basis of inclusion information included in a Beacon signal transmitted from a neighboring wireless base station.

<14> The wireless terminal described in <13>,
in which the control unit transmits a judgment criterion information for selecting a wireless base station with which the wireless terminal is to establish the communication connection, to a wireless device that controls the inclusion information included in the Beacon signal.

<15> The wireless terminal described in <14>,
in which the judgment criterion information includes information indicating a plurality of priorities of the judgment criterion information.

<16> The wireless terminal described in <14>,
in which the judgment criterion information includes a received electric power, a BSS load, an access delay, and a signal quality.

<17> The wireless terminal described in <13>,
in which the control unit presents a candidate for a new wireless base station with which the wireless terminal is to establish the communication connection on the basis of the inclusion information included in the Beacon signal transmitted from the neighboring wireless base station, and in a case where an operation for giving an instruction on an establishment of the communication connection with the candidate that has been presented, the control unit selects the candidate that has been operated as the new wireless base station with which the wireless terminal is to establish the communication connection.

<18> A wireless communication method by a wireless terminal, the wireless communication method including:
a control process for selecting a new wireless base station with which the wireless terminal is to establish a communication connection on the basis of inclusion information included in a Beacon signal transmitted from a neighboring wireless base station.

<19> A wireless base station including:
a control unit configured to receive a control notification for providing notification of inclusion information to be included in a Beacon signal, and configured to transmit the Beacon signal including the inclusion information on the basis of the control notification.

<20> A wireless communication method by a wireless base station, the wireless communication method including:
a control process for receiving a control notification for providing notification of inclusion information to be included in a Beacon signal, and transmitting the Beacon signal including the inclusion information on the basis of the control notification.

REFERENCE SIGNS LIST

11 Controller
12, 12-1, 12-2 Base station
13 Communication device
31 Control unit
32 Data processing unit
33 Wireless communication unit
34 Wired communication unit
35 Network control unit
51 Control unit
52 Data processing unit
53 Wireless communication unit
54 Wired communication unit
55 Display unit
56 Operation unit
71 Control unit
72 Data processing unit
73 Wireless communication unit
74 Display unit

The invention claimed is:

1. A wireless device configured to operate as a wireless base station and comprising:
a transceiver; and
control circuitry configured to:
communicate with a wireless terminal via an established communication channel,
receive from the wireless terminal a transition judgement information request frame that includes a transition judgement information request indicating that a quality of a signal received by the wireless terminal from the wireless device is above a first predetermined threshold related to a request for an immediate transfer of the wireless terminal to another wireless base station and is below a second predetermined threshold related to a quality of communication between the wireless terminal and the wireless device,
wherein the transition judgement information request frame includes base station transition criteria that includes a one or more criteria identifiers (IDs) arranged in descending priority order,
relay the transition judgement information request to a wireless network controller,
receive a beacon element control notification frame including a beacon element control notification from the wireless network controller,
wherein the beacon element control notification frame includes a required beacon element ID which includes a policy field related to beacon timing or periodicity, and a mandatory element ID field that includes one or more pairs of criteria ID and required beacon element ID fields, each of the criteria ID of the mandatory element ID field corresponding to a respective criteria ID of transition judgement information request frame,
in response to the beacon element control notification, transmit a beacon frame to the wireless terminal,
wherein the beacon frame includes a Medium Access Control (MAC) header and a frame body, the frame body including a timestamp field, a beacon interval field indicating a time interval in which the beacon frame is transmitted, a base station capability information field, a base station identification field, a base station supported rates field, and a priority field indicating a type of service and a service priority, and
wherein the required beacon element ID fields of the beacon element control notification frame comprise information about plural communication parameters.

2. The wireless device according to claim 1, wherein the plural communication parameters comprise information about base station load, access delay or quality of service.

3. The wireless device according to claim 1, wherein, in response to the beacon frame, the control circuitry configured to:
receive an uplink signal from the wireless terminal that indicates that the wireless terminal has compared the beacon frame with a beacon frame of another wireless base station and has determined to apply for a connection to the another wireless base station,
perform a communication quality degradation assessment,
based on the communication quality degradation assessment indicating that communication quality between the wireless terminal and the wireless device has degraded below a predetermined level, perform a process to transition the wireless terminal to the another wireless base station.

4. A method performed by a wireless device configured to operate as a wireless base station, the method comprising:
communicating with a wireless terminal via an established communication channel,
receiving from the wireless terminal a transition judgement information request frame that includes a transition judgement information request indicating that a quality of a signal received by the wireless terminal from the wireless device is above a first predetermined threshold related to a request for an immediate transfer of the wireless terminal to another wireless base station and is below a second predetermined threshold related to a quality of communication between the wireless terminal and the wireless device,
wherein the transition judgement information request frame includes base station transition criteria that includes a one or more criteria identifiers (IDs) arranged in descending priority order,
relaying the transition judgement information request to a wireless network controller,
receiving a beacon element control notification frame including a beacon element control notification from the wireless network controller,
wherein the beacon element control notification frame includes a required beacon element ID which includes a policy field related to beacon timing or periodicity, and a mandatory element ID field that includes one or more pairs of criteria ID and required beacon element ID fields, each of the criteria ID of the mandatory element ID field corresponding to a respective criteria ID of transition judgement information request frame,
in response to the beacon element control notification, transmitting a beacon frame to the wireless terminal,
wherein the beacon frame includes a Medium Access Control (MAC) header and a frame body, the frame body including a timestamp field, a beacon interval field indicating a time interval in which the beacon frame is transmitted, a base station capability information field, a base station identification field, a base station supported rates field, and a priority field indicating a type of service and a service priority, and
wherein the required beacon element ID fields of the beacon element control notification frame comprise information about plural communication parameters.

5. The method of claim 4, further comprising:
in response to the beacon frame, receiving an uplink signal from the wireless terminal that indicates that the wireless terminal has compared the beacon frame with a beacon frame of another wireless base station and has determined to apply for a connection to the another wireless base station, performing a communication quality degradation assessment, based on the communication quality degradation assessment indicating that communication quality between the wireless terminal and the wireless device has degraded below a predetermined level, performing a process to transition the wireless terminal to the another wireless base station.

6. A non-transitory computer product containing instructions configured to cause a wireless device configured to operate as a wireless base station to perform a method, the method comprising:

communicating with a wireless terminal via an established communication channel, receiving from the wireless terminal a transition judgement information request frame that includes a transition judgement information request indicating that a quality of a signal received by the wireless terminal from the wireless device is above a first predetermined threshold related to a request for an immediate transfer of the wireless terminal to another wireless base station and is below a second predetermined threshold related to a quality of communication between the wireless terminal and the wireless device, wherein the transition judgement information request frame includes base station transition criteria that includes a one or more criteria identifiers (IDs) arranged in descending priority order, relaying the transition judgement information request to a wireless network controller, receiving a beacon element control notification frame including a beacon element control notification from the wireless network controller, wherein the beacon element control notification frame includes a required beacon element ID which includes a policy field related to beacon timing or periodicity, and a mandatory element ID field that includes one or more pairs of criteria ID and required beacon element ID fields, each of the criteria ID of the mandatory element ID field corresponding to a respective criteria ID of transition judgement information request frame, in response to the beacon element control notification, transmitting a beacon frame to the wireless terminal, wherein the beacon frame includes a Medium Access Control (MAC) header and a frame body, the frame body including a timestamp field, a beacon interval field indicating a time interval in which the beacon frame is transmitted, a base station capability information field, a base station identification field, a base station supported rates field, and a priority field indicating a type of service and a service priority, wherein the required beacon element ID fields of the beacon element control notification frame comprise base station information.

* * * * *